(12) United States Patent
Hesselink et al.

(10) Patent No.: US 10,291,686 B2
(45) Date of Patent: *May 14, 2019

(54) MANAGED PEER-TO-PEER APPLICATIONS, SYSTEMS AND METHODS FOR DISTRIBUTED DATA ACCESS AND STORAGE

(71) Applicant: WESTERN DIGITAL TECHNOLOGIES, INC., San Jose, CA (US)

(72) Inventors: Lambertus Hesselink, Portola Valley, CA (US); Dharmarus Rizal, Mountain View, CA (US); Eric S. Bjornson, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/894,648

(22) Filed: Feb. 12, 2018

(65) Prior Publication Data

US 2018/0234484 A1    Aug. 16, 2018

Related U.S. Application Data

(60) Continuation of application No. 15/156,508, filed on May 17, 2016, now Pat. No. 9,894,141, which is a
(Continued)

(51) Int. Cl.
*H04L 29/08* (2006.01)
*G06F 16/11* (2019.01)
(Continued)

(52) U.S. Cl.
CPC ............ *H04L 67/06* (2013.01); *G06F 16/128* (2019.01); *G06F 16/1827* (2019.01);
(Continued)

(58) Field of Classification Search
CPC ............... G06F 17/30; G06F 17/30424; G06F 17/30088; G06F 17/302; G06F 16/1827;
(Continued)

(56) References Cited

U.S. PATENT DOCUMENTS 5,339,392 A * 8/1994 Risberg ................ G06F 3/0481
715/255
5,408,600 A    4/1995 Garfinkel et al.
(Continued)

FOREIGN PATENT DOCUMENTS

CA        2136150 A1    5/1996
CA        2 462 448 C    4/2010
(Continued)

OTHER PUBLICATIONS

Arpaia et al., "A Measurement Laboratory on Geographic Network for Remote Test Experiments," IEEE Instrucmentation and Measurement, Tech. Conf., May 18-21, 1998, pp. 1-6.
(Continued)

*Primary Examiner* — Thanhnga B Truong
(74) *Attorney, Agent, or Firm* — Knobbe, Martens, Olson & Bear LLP

(57) ABSTRACT

Secure and remote operation of a remote computer from a local computer over a network includes authenticating a remote computer for connection to a computer over the network and/or a local computer for connection to a remote computer over the network; establishing a secure connection therebetween; and integrating a desktop of a remote computer on a display of a local computer. Functions that are performed may include one or more of: integrating a file structure of accessible files accessed at the second or first computer, into a file structure contained at the first or second computer, respectively; at least one of integrating a desktop of the second computer on a display of the first computer and
(Continued)

integrating a desktop of the first computer on a display of the second computer; and directly operating the second computer from the first computer or the first computer from the second computer.

16 Claims, 16 Drawing Sheets

Related U.S. Application Data division of application No. 14/161,612, filed on Jan. 22, 2014, now Pat. No. 9,348,864, which is a division of application No. 13/075,128, filed on Mar. 29, 2011, now Pat. No. 8,661,507, which is a division of application No. 10/988,394, filed on Nov. 13, 2004, now Pat. No. 7,934,251, which is a continuation-in-part of application No. 10/300,500, filed on Nov. 19, 2002, now Pat. No. 7,120,692, which is a continuation-in-part of application No. 09/608,685, filed on Jun. 29, 2000, now Pat. No. 6,732,158, which is a continuation-in-part of application No. 09/454,178, filed on Dec. 2, 1999, now Pat. No. 6,499,054.

(60) Provisional application No. 60/520,481, filed on Nov. 14, 2003, provisional application No. 60/331,642, filed on Nov. 20, 2001.

(51) Int. Cl.
  *G06F 16/245* (2019.01)
  *G06F 16/182* (2019.01)
  *H04L 29/06* (2006.01)

(52) U.S. Cl.
  CPC ........ *G06F 16/245* (2019.01); *H04L 63/0209* (2013.01); *H04L 63/029* (2013.01); *H04L 67/1097* (2013.01); *H04L 67/125* (2013.01); *H04L 67/2842* (2013.01); *H04L 67/02* (2013.01); *H04L 67/2814* (2013.01)

(58) Field of Classification Search
  CPC . G06F 16/128; G06F 16/245; H04L 63/0209; H04L 63/029; H04L 67/125; H04L 67/06; H04L 67/1097; H04L 67/2842; H04L 67/2814; H04L 67/02
  USPC ....... 714/6.3, 6.23, 6.12; 709/210, 246, 220, 709/232; 715/762; 726/1–3
  See application file for complete search history.

(56) References Cited

U.S. PATENT DOCUMENTS

| | | |
|---|---|---|
| 5,537,141 A | 7/1996 | Harper et al. |
| 5,600,834 A | 2/1997 | Howard |
| 5,623,601 A | 4/1997 | Vu |
| 5,634,052 A | 5/1997 | Morris |
| 5,644,714 A | 7/1997 | Kikinis |
| 5,692,214 A | 11/1997 | Levine |
| 5,745,906 A | 4/1998 | Squibb |
| 5,758,071 A * | 5/1998 | Burgess .............. G06F 9/44505 709/213 |
| 5,793,952 A | 8/1998 | Limsico |
| 5,793,964 A | 8/1998 | Rogers et al. |
| 5,805,442 A | 9/1998 | Crater et al. |
| 5,835,911 A | 11/1998 | Nakagawa et al. |
| 5,841,976 A | 11/1998 | Tai et al. |
| 5,845,282 A | 12/1998 | Alley et al. |
| 5,850,449 A | 12/1998 | McManis |
| 5,852,713 A * | 12/1998 | Shannon .............. G06F 11/1451 714/6.3 |
| 5,878,213 A | 3/1999 | Bittinger et al. |
| 5,886,707 A | 3/1999 | Berg |
| 5,893,119 A | 4/1999 | Squibb |
| 5,907,322 A | 5/1999 | Kelly et al. |
| 5,930,473 A | 7/1999 | Teng et al. |
| 5,946,697 A | 8/1999 | Shen |
| 5,956,487 A | 9/1999 | Venkatraman et al. |
| 5,960,177 A | 9/1999 | Tanno |
| 5,968,131 A | 10/1999 | Mendez et al. |
| 5,974,446 A | 10/1999 | Sonnenreich et al. |
| 5,982,362 A | 11/1999 | Crater et al. |
| 5,983,350 A | 11/1999 | Minear et al. |
| 5,990,884 A | 11/1999 | Douma et al. |
| 6,002,768 A | 12/1999 | Albanese et al. |
| 6,012,086 A | 1/2000 | Lowell |
| 6,014,451 A | 1/2000 | Berry et al. |
| 6,014,706 A | 1/2000 | Cannon et al. |
| 6,021,118 A | 2/2000 | Houck et al. |
| 6,052,750 A | 4/2000 | Lea |
| 6,065,062 A | 5/2000 | Periasamy et al. |
| 6,078,961 A | 6/2000 | Mourad et al. |
| 6,081,508 A | 6/2000 | West et al. |
| 6,081,693 A | 6/2000 | Wicks |
| 6,085,192 A | 7/2000 | Mendez et al. |
| 6,085,227 A | 7/2000 | Edlund et al. |
| 6,101,265 A | 8/2000 | Bacus et al. |
| 6,104,716 A | 8/2000 | Crichton et al. |
| 6,105,067 A | 8/2000 | Batra |
| 6,133,909 A | 10/2000 | Schein et al. |
| 6,173,112 B1 | 1/2001 | Gruse et al. |
| 6,182,094 B1 | 1/2001 | Humpleman et al. |
| 6,182,139 B1 | 1/2001 | Brendel |
| 6,182,226 B1 | 1/2001 | Reid et al. |
| 6,184,863 B1 | 2/2001 | Sibert et al. |
| 6,198,905 B1 | 3/2001 | Remschel |
| 6,212,327 B1 | 4/2001 | Berstis et al. |
| 6,212,558 B1 | 4/2001 | Antur et al. |
| 6,219,669 B1 | 4/2001 | Haff et al. |
| 6,223,289 B1 | 4/2001 | Wall et al. |
| 6,230,203 B1 | 5/2001 | Koperda et al. |
| 6,233,589 B1 | 5/2001 | Balcha et al. |
| 6,255,961 B1 | 7/2001 | Van Ryzin et al. |
| 6,261,103 B1 | 7/2001 | Stephens et al. |
| 6,263,371 B1 | 7/2001 | Geagan, III et al. |
| 6,275,942 B1 | 8/2001 | Bernhard et al. |
| 6,288,753 B1 | 9/2001 | Denicola et al. |
| 6,327,671 B1 * | 12/2001 | Menon ................ G06F 11/2066 707/999.2 |
| 6,366,930 B1 | 4/2002 | Parker et al. |
| 6,377,573 B1 | 4/2002 | Shaffer et al. |
| 6,401,239 B1 | 6/2002 | Miron |
| 6,408,435 B1 | 6/2002 | Sato |
| 6,427,161 B1 | 7/2002 | Livecchi |
| 6,445,872 B1 | 9/2002 | Sano et al. |
| 6,463,459 B1 | 10/2002 | Orr et al. |
| 6,499,054 B1 | 12/2002 | Hesselink et al. |
| 6,513,068 B1 | 1/2003 | Jones et al. |
| 6,553,422 B1 | 4/2003 | Nelson |
| 6,571,245 B2 | 5/2003 | Huang et al. |
| 6,581,092 B1 | 6/2003 | Motoyama et al. |
| 6,588,013 B1 | 7/2003 | Lumley et al. |
| 6,615,088 B1 | 9/2003 | Myer et al. |
| 6,625,623 B1 | 9/2003 | Midgley et al. |
| 6,640,241 B1 | 10/2003 | Ozzie et al. |
| 6,654,746 B1 | 11/2003 | Wong et al. |
| 6,668,288 B1 | 12/2003 | Midwinter et al. |
| 6,714,968 B1 | 3/2004 | Prust |
| 6,732,158 B1 | 5/2004 | Hesselink et al. |
| 6,754,678 B2 | 6/2004 | Norris et al. |
| 6,754,707 B2 | 6/2004 | Richards et al. |
| 6,785,716 B1 | 8/2004 | Nobakht |
| 6,799,248 B2 | 9/2004 | Scherr |
| 6,938,042 B2 | 8/2005 | Aboulhosn et al. |
| 6,971,018 B1 | 11/2005 | Witt et al. |
| 7,020,778 B1 | 3/2006 | Miettinen et al. |
| 7,043,644 B2 | 5/2006 | Debruine |
| 7,058,696 B1 | 6/2006 | Phillips et al. |
| 7,069,310 B1 | 6/2006 | Bartholomew |
| 7,114,080 B2 | 9/2006 | Rahman et al. |
| 7,120,692 B2 | 10/2006 | Hesselink et al. |

(56) References Cited

U.S. PATENT DOCUMENTS

| | | |
|---|---|---|
| 7,124,372 B2 | 10/2006 | Brin |
| 7,127,745 B1 | 10/2006 | Herse et al. |
| 7,203,735 B1 | 4/2007 | Le Pennec et al. |
| 7,237,114 B1 | 6/2007 | Rosenberg |
| 7,254,786 B2 | 8/2007 | Henriquez |
| 7,404,207 B2 | 7/2008 | Perry |
| 7,424,543 B2 | 9/2008 | Rice, III |
| 7,437,429 B2 | 10/2008 | Pardikar et al. |
| 7,454,443 B2 | 11/2008 | Ram et al. |
| 7,467,187 B2 | 12/2008 | Hesselink et al. |
| 7,546,353 B2 | 6/2009 | Hesselink et al. |
| 7,587,467 B2 | 9/2009 | Hesselink et al. |
| 7,600,036 B2 | 10/2009 | Hesselink et al. |
| 7,788,404 B2 | 8/2010 | Hesselink et al. |
| 7,792,934 B2 | 9/2010 | Klein |
| 7,917,628 B2 | 3/2011 | Hesselink et al. |
| 7,934,251 B2 | 4/2011 | Hesselink et al. |
| 7,949,564 B1 | 5/2011 | Hughes et al. |
| 7,962,531 B2 | 6/2011 | Hitz et al. |
| 8,004,791 B2 | 8/2011 | Szeremeta et al. |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| 8,762,682 B1 | 6/2014 | Stevens |
| 8,780,004 B1 | 7/2014 | Chin |
| 8,793,374 B2 | 7/2014 | Hesselink et al. |
| 8,819,443 B2 | 8/2014 | Lin |
| 2001/0009014 A1 | 7/2001 | Savage, III et al. |
| 2001/0013127 A1 | 8/2001 | Tomita et al. |
| 2001/0018701 A1 | 8/2001 | Livecchi |
| 2001/0023451 A1 | 9/2001 | Hericourt |
| 2001/0046366 A1 | 11/2001 | Susskind |
| 2001/0053274 A1 | 12/2001 | Roelofs et al. |
| 2002/0023143 A1 | 2/2002 | Stephenson et al. |
| 2003/0084104 A1 | 5/2003 | Salem et al. |
| 2003/0191911 A1 | 10/2003 | Kleinschnitz, Jr. et al. |
| 2005/0028208 A1 | 2/2005 | Ellis et al. |
| 2005/0144195 A1 | 6/2005 | Hesselink et al. |
| 2005/0144200 A1 | 6/2005 | Hesselink et al. |
| 2005/0188002 A1 | 8/2005 | Yang |
| 2011/0289570 A1 | 11/2011 | Yang et al. |
| 2012/0036041 A1 | 2/2012 | Hesselink |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0095439 A1 | 4/2014 | Ram |
| 2014/0169921 A1 | 6/2014 | Carey |
| 2014/0173215 A1 | 6/2014 | Lin et al. |

FOREIGN PATENT DOCUMENTS

| | | |
|---|---|---|
| CN | 028230773.9 | 3/2005 |
| CN | 02823077.9 | 6/2008 |
| DE | 197 40 079 A1 | 3/1999 |
| EP | 0 805 594 A2 | 11/1997 |
| EP | 0 917 052 A1 | 5/1999 |
| EP | 0 986 225 A1 | 3/2000 |
| IN | 214359 | 2/2008 |
| JP | H08-314835 | 11/1996 |
| JP | H10-155131 | 6/1998 |
| JP | 4667747 B2 | 1/2011 |
| KR | 10-0994666 | 11/2010 |
| WO | WO 97/13368 A1 | 4/1997 |
| WO | WO 97/18636 A2 | 5/1997 |
| WO | WO 98/17064 A1 | 4/1998 |
| WO | WO 99/21118 A1 | 4/1999 |
| WO | WO 99/50994 A2 | 10/1999 |
| WO | WO 00/05903 A2 | 2/2000 |
| WO | WO 00/11832 A1 | 3/2000 |
| WO | WO 01/31875 A2 | 5/2001 |
| WO | WO 01/35599 A2 | 5/2001 |
| WO | WO 01/40961 A1 | 6/2001 |
| WO | WO 01/75836 A2 | 10/2001 |
| WO | WO 01/78349 A2 | 10/2001 |
| WO | WO 02/37380 A1 | 5/2002 |
| WO | WO 03/044676 A1 | 5/2003 |
| WO | WO 2004/046852 A2 | 6/2004 |

OTHER PUBLICATIONS

Hong Shen et al., "Conducting Laboratory Experiments over the Internet," XP-002320128, IEEE Trans. on Education, vol. 42, No. 3, Aug. 1999, pp. 1-6.

Tina Bird, "VPN Information on the World Wide Web," Http://vpn.shmoo.com/vpn/v[pn-general.html. Apr. 28, 2003, pp. 1-2.

T. Richardson et al., "Virtual Network Computing," http://computer.org/internet, Jan. & Feb. 1998, pp. 33-38.

Ramesh Jain, "The Convergence of PCs and TV," IEEE Multimedia, vol. 6, Issue 4, Oct. 1999, 1 page.

Goldberg, et al., "Beyond the Web: Manipulating the Real World", Computer Networks and ISDN Systems, vol. 28, Dec. 1995, pp. 209-219.

Henry, "Controls Laboratory Teaching via the World Wide Web", ASEE, Jun. 1996, 4 pages.

Internet cite http://www.ni.com/labview/, LabVIEW from National Instruments, Jan. 18, 2000, 1 page.

National Instruments Manual entitled "LabVIEW—Instrumentation and Analysis Software", Jan. 2000, pp. 61,63, 75 & 76.

Nishimura, et al., "Real-Time Camera Control for Videoconferencing Over the Internet", 5th International Conference on Real-Time Computing Systems and Applications, Oct. 1998, pp. 121-124.

Scharf, R., et al., "Using Mosaic for Remote Test System Control Supports Distributed Engineering", 2nd International WWW Conference Mosaic and the Web, NCSA, Oct. 1994, 9 pages.

"The Next Step in Server Load Balancing—White Paper", XP-002974311, Alteon Web Systems, Inc., Nov. 1999, 16 pages.

Tol et al., "TV Anytime: Store IT on My TV," Conf. on Consumer Electronic, 2000 Digest of Technical Papers, ICCE 2000, IEEE, pp. 30-31.

Zhe Wang et al., "Persistent Connection Behavior of Popular Browers," http://pages.cs.wise.edu/-cao/papers/persistentconnection.html., Dec. 1998, pp. 1-4.

J. Henry, "Laboratory Teaching Via the World Wide Web," ASEE Southeastern Section Paper, Apr. 1998, pp. 1-11.

Office Action dated Jan. 12, 2017 in European Patent Application No. 03 781 759.0.

\* cited by examiner

MANAGED PEER-TO-PEER APPLICATIONS, SYSTEMS AND METHODS FOR DISTRIBUTED DATA ACCESS AND STORAGE

CROSS-REFERENCE TO RELATED APPLICATIONS

The present application is a Continuation of U.S. application Ser. No. 15/156,508, filed May 17, 2016, which is a Divisional of U.S. application Ser. No. 14/161,612, filed Jan. 22, 2014, now U.S. Pat. No. 9,348,864, which is a Divisional of U.S. application Ser. No. 13/075,128, filed Mar. 29, 2011, now U.S. Pat. No. 8,661,507, which is a Divisional of U.S. application Ser. No. 10/988,394, filed Nov. 13, 2004, now U.S. Pat. No. 7,934,251, which is a Continuation-In-Part of U.S. application Ser. No. 10/300,500, filed Nov. 19, 2002, now U.S. Pat. No. 7,120,692, which is a Continuation-In-Part of U.S. application Ser. No. 09/608,685, filed Jun. 29, 2000, now U.S. Pat. No. 6,732,158, which is a Continuation-In-Part of U.S. application Ser. No. 09/454,178, filed Dec. 2, 1999, now U.S. Pat. No. 6,499,054. U.S. application Ser. No. 10/988,394, filed Nov. 13, 2004, also claims priority to U.S. Provisional Patent Application Ser. No. 60/520,481, filed Nov. 14, 2003. U.S. application Ser. No. 10/300,500, filed Nov. 19, 2002, also claims priority to U.S. Provisional Patent Application Ser. No. 60/331,642, filed Nov. 20, 2001. Each of the afore-mentioned applications and patents are hereby incorporated herein, in their entireties, by reference thereto.

BACKGROUND OF THE INVENTION

Currently, computer systems that run application programs such as word processor, photo editor or spread sheet applications may utilize local storage devices with magnetic or optical storage media for data access and repository. Another approach is to mount a remote storage device to the local system. This can be done using standard Server Message Block (SMB) or also currently known as Common Internet File System (CIFS) protocol to facilitate drive sharing over a computer network. In a local scenario, a user may use a first computer to run an application that may retrieve and store data on a storage device that is local to the first computer. Alternatively, the user may mount a remote storage device (which may be local to a second computer on the network) on the first computer, such that the user can run the application to retrieve and store data on the remote storage device. As a result, the user is not required to reside and use the second computer to access, read, write, and/or print data such as such as documents, pictures or music files stored in a storage device local to the second computer. In a typical scenario, both the first and second computers described are located in a local area network connected via a high-speed data link such as Ethernet, USB, WIFI, or the like.

In both the examples described above, applications on the first computer are primarily designed to rely on having a high-performance (i.e. high bandwidth, low latency) data access to the local and remote storage devices. As a result, many applications do not have optimized data access capabilities because they have insignificant effects on the overall performance of the applications in a high-performance data access environment. For example, the application may query the remote storage device to read or write blocks of data through numerous rounds of serial local network trips. As another example, if the user instructs the application to save the application data (e.g., which may be a document, digital photo, spreadsheet, multimedia data, etc.) on a storage device, the application may do so by rewriting the entire application file without determining which part of the file actually needs modifications in comparison to a previously existing file that the current storage operation is replacing. Because the computers have high-performance data access capability, the user may not notice any significant performance differences in how the application utilizes the remote storage device. Hence, for many applications, having a high-performance data access to storage devices is critically important for proper program execution such as for temporary storage to store intermediate computation results or to ensure reliability of data transactions.

These current techniques, however can be impractical to deploy over a wide area network such as the public Internet. In a local area network, high bandwidth and low latency data network pipes between the computers described above can be provided at relatively low cost. A typical Ethernet local area network can facilitate 100 mbps for both upload and download data transfer rate. However, if those computers were located at different locations in a wide area network such as the public Internet, there would be recurring charges associated with the telecommunication services that would normally be based on bandwidth utilization. As a result, relatively large costs would be required to run existing applications on the first computer with the same or similar high-performance data access to the remote storage device associated with the second computer over a wide area network. Further, it is often not even possible to connect the first and second computers with such high-performance data access capability, depending upon the geographical locations of the first and second computers, and publicly available IP addresses.

The Internet has made large amounts of information available to computer users around the world. A tremendous amount of information is exchanged between individual users via public computer networks, e.g., the Internet, and the volume of such information will likely continue to increase. Additionally, the number and variety of communications devices capable of accessing the Internet, as well as other wide area networks not connected to the Internet are increasing rapidly, as are the number and variety of networks independent of the Internet, and the complexity, size and breadth of the Internet itself.

Since many of these devices operate upon different standards for operating systems as well as even connection and transmission softwares, a result is that it is becoming increasingly complicated and difficult to share files or transfer files from one device to another. For example, it is no simple task for a user to transfer electronic images from a home library of still images of his family, stored on a hard drive of a personal computer (PC), for example, to a personal digital assistant (PDA) to show them to relatives when traveling to their home. While it is possible to upload digitized photos to a web page provided by a photo service center, this solution leave some things to be desired too, since many users may be uncomfortable storing photos of their families on some photo service server in some unknown location where it is also often unknown what level of security (if any) such server is provided with.

Another common problem occurs when an employee needs access to files on his or her computer at work, but is at home, and has no direct access to the files. This often requires a trip to the office to download the files to a portable storage device, such as a floppy disk, CDR, CDRW or flash memory. Although some facilities have installed virtual private networks (VPNs) which would allow a worker in this situation to access his/her files from home, VPNs are expensive, awkward and cumbersome to use, and are simply not currently available to many users It is not uncommon today for a user to have separate computing systems for business and home use at home, one or more computer systems at work, one or more PDA's, laptops and even one or more cellular phones with data storage capability, all of which may have overlapping data files that the user may wish to access at any given time from any one of these devices. This requires that the common data all be kept current, i.e., with the latest version of each common file, as it is typical to update and edit files. This in itself can be an enormously time consuming and tedious responsibility to frequently synchronize files between all of the devices that maintain a local copy.

Current synchronization solutions, VPNs, as well as the ability to upload files to a central server location do not adequately address the above problems, as they are cumbersome and time consuming to use, and, in the case of VPNs, expensive and not widely available to the average user.

It would be desirable to provide a solution which is easy to use, relatively inexpensive and widely available to allow users to access their information (i.e., data files) wherever they may reside on any network accessible communication device, from any location accessible over that network, using any network accessible device, in a secure mode. This would ensure that only that user (and optionally any other users that the user wished to grant permission to) can access the user's files, even though such access may be made via a public network, such as the Internet, for example. It would be desirable that such a system would provide sufficient security so that no unauthorized users can steal or "hack into" a user's data files while it travels through the public network (e.g., Internet).

It would further be desirable that such a solution would take little or no time to set up and little or no effort or capital to maintain, as IT managers are already overloaded with complexity and time (and money) consuming tasks to maintain their current systems.

Still further, it would be desirable if such a solution permitted secure access by a variety of methods, including DSL, dial-up and cable modems, Ethernet ports (such as from a hotel), wireless (such as wireless Wi-Fi hotspot, or other wireless technologies) and from an Internet café using a temporary machine, as well as from behind different firewalls. The Internet is currently quite accessible and accomplished in offering public access, but is still quite limited in permitting private access.

Remote, secure access of devices through the Internet has presented many problems. Providing secure access to remote devices has typically required setup of a dedicated private network or dedicated virtual private network (VPN) for remote device access. A dedicated server within the private network provides for communication with the Internet, and a dedicated telephone line, digital subscriber line (DSL) or like communication interface is used to connect the device to the dedicated server. Such a system involves costly and difficult installation and maintenance. Connection to the remote access device is typically through a modem connection, and data transfer between the device and remote user is slow. Even where DSL or other broadband capability is available for connection to the remote device, real time data transfer of video streams and data intensive operations cannot be effectively carried out. Remote device access systems have also been deficient in that only a single user can access a remote device at a time. This problem is particularly acute in situations when a customer and a support person at different locations both simultaneously wish to access a remote device at a third location.

Remote access of devices via the Internet or other wide area network in many cases involves a user located within one private local area network, and a device located within another, different private network. Information exchange between private computer networks via the Internet has created various security issues associated with protection of information on the private computer networks. Connection of a personal computer in a private network to the Internet can expose confidential data to unauthorized access or hostile attack from virtually anywhere in the world. Some of the sophisticated types of security threats posed by "hackers" include "logic bomb", "trapdoor", "Trojan horse", "virus" and "worm" programs. Such software programs can work independently or via an invoked host program to breach security, disrupt activity and cause damage by destruction of electronic files, alteration of databases, or introduction of computer viruses which affect the operability of the private computer network, computer hardware connected to the private network, and network-accessible devices within the private network.

One approach to private network security has been the use of "firewalls" embodied in hardware and/or software to protect private local area networks from hostile intrusion from the Internet. A firewall is located generally at the junction point or gateway between a private network and a public network such as the Internet and allows a network administrator to selectively offer access to specific types of Internet services to specific LAN users by filtering inbound and outbound traffic. Nearly every private network now has some form of firewall in place to protect internal data from outside intrusion.

Firewalls may operate by inspection of binary data at different layers of the TCP/IP (Transport Control Protocol/Internet Protocol) hierarchy in order to use different criteria for restriction of traffic. Binary data from the highest protocol layer, i.e., the Application Layer, is encapsulated within lower-level protocols all the way to the physical layer for transmission in network media such as twisted pair wire, fiber optic, cable or wireless channels. Packet filtering firewalls may be carried out at the Internet Protocol or Network layer. Circuit level gateway firewalls work at the TCP or Session Layer, and monitor TCP "handshaking" between packets to determine whether a requested session is legitimate. Application level gateway firewalls or "proxies" are application specific and can filter application specific commands such as http:post and get, which cannot be accomplished by packet filtering or circuit level firewalls. State-full multilayer inspection firewalls can combine the aspects of the above types of firewalls to provide a high level of security.

While firewalls have been largely beneficial for the security of private networks, the implementation of firewalls brings some important drawbacks. Particularly, there is an increasing use of applications that involve data transfer between different, heterogeneous private networks via the Internet. Users increasingly need to make connections from various locations across local-area-networks or wide-area-networks to access data. This is currently typical of even a home user, who may have a local area network in his or her home with a firewall between it and the Internet. Access to the user's work computer presents this problem, as the work computer is most likely on a network behind a firewall at the work location. The firewalls involved will typically be different due to the different security needs and environments involved in the different private networks, and the firewall systems can impose serious limitations to data transfer between the heterogeneous networks.

As mentioned above, one approach to allowing secured connection between local area networks is to employ virtual private network (VPN) systems. However, such VPN systems require expensive and complex installation of additional hardware and/or software at network access locations. The use of VPN systems also require that network administrators for participating networks implement some kind of joint network security policy, which is difficult or impossible in many situations. Furthermore, VPN systems are still an "emerging" technology, and interoperability among different VPN systems imposes limitations to connection of multiple private networks. Still further, VPNs may restrict some wireless access.

Examples of other efforts at providing remote access to data include those made by pcAnywhere (Symantec) and GoToMyPC™ (https://www.gotomypc.com/), each of which offer software solutions that give desktop control; i.e., allowing the user to control the user's desktop remotely. The user logs in to a remote desktop, then accesses a file structure of the remote machine, clicks on the file or files the user is interested in accessing, then clicks on the user's own local site on the current machine where the user wants the file or files to be stored. The software then transfers the file or files to the user's current (local) machine. When the user is finished with the files, the files are then re-transmitted back to the remote machine from which the files were downloaded. This is not intuitive and it also requires significant amounts of bandwidth, since entire files must be transferred. If the files contain graphics, video or other data requiring a large amount of storage space, these solutions can become virtually unusable, particularly if the user is on a dial up modem connection. Even if the files to be transferred are strictly text, these solutions require a great deal of bandwidth just to control the video, since the "remote desktop" that appears at the user's device is a video image of the desktop that is being remotely accessed. These products are fundamentally dependent upon sending computer screen display data, as noted, and have significant difficulty, if at all possible, in connecting to various non-Windows® based devices such as PDAs, cellular phones, MP3 players, home entertainment equipment, industrial controls and home appliances.

To use pcAnywhere or GoToMyPC™ a user must log in to the web site of either of these services, and then get a picture of the remote desktop. From the desktop, the user sees a file structure, and can navigate into the file structure to select a file or files to be transferred. Once selected, the file is transferred to the user's local computer. These solutions do not perform any synchronization or updating, but merely send the entire file or files, lock, stock and barrel, both ways. Nor do either of these products address the problems presented in communicating between two computers, each of which are located behind firewalls having different criteria for restricting communications traffic therethrough.

Many companies do not want their employees to store all of their sensitive data that they need to use when away from the office locally on a portable device, because this poses a security risk with the possibility that the portable device may be stolen. Although it is possible to encrypt such data, this requires additional time, expense and effort, and is cumbersome. Thus, a solution is needed that enables rapid, secure access to such information from a remote location (such as the office, in this example) to a local user (e.g., the employee who is on travel).

Some Microsoft operating systems provide the ability to mount drives (e.g., remote devices) other than the ones that are locally present at the site where a user is operating from. These "virtual drives" are located physically on some other computer system and may be accessed through a central server, wherein each user computer can connect locally to the central server. In such an arrangement, a local user can store data at local drive or store it centrally on the server. However, if a remote device is behind a firewall, this solution does not allow access to the remote device, and generally a VPN is installed to permit access. Further, if a user is not set up with the Micorsoft solution discussed above, and has two or more devices using the same data file or files, the user must frequently synchronize the data among the devices. The synchronization process is very time consuming, and doesn't always work on the first try. If the synchronization stalls or crashes part way through, the user must start all over again performing the entire synchronization task. This can be very frustrating when a crash occurs after 90% completion of a synchronization operation, for example.

There is accordingly a need for a system that allows quick and easy communication between users and remote, network-enabled devices, that allows collaborative use of remote devices by multiple users, that is simple and inexpensive to install and maintain, that provides secure communication between firewall-protected private networks, as well as non-firewall protected computers and devices, and which is generally compatible with emerging, increasingly important applications such as remote access to a user's files and directories, synchronization of files, backup of files and controlling and monitoring functions for remote devices. The present invention satisfies these needs, as well as others, and generally overcomes the deficiencies found in the background art.

SUMMARY OF THE INVENTION

The invention provides applications, systems, methods and computer readable media for securely and remotely operating a remote computer from a local computer over a public network while providing seamless, firewall-compliant connectivity are provided, including the steps of: authenticating at least one of the remote computer for connection to the local computer over the public network and the local computer for connection to the remote computer over the public network; establishing a secure connection between the local computer and the remote computer over the public network; and integrating a desktop of the remote computer on a display of the local computer.

Systems, applications, methods and computer readable media for securely and remotely operating a remote computer from a local computer over a network while providing seamless, firewall-compliant connectivity are provided, including the steps of: authenticating at least one of the remote computer for connection to the local computer over the network and the local computer for connection to the remote computer over the network; establishing a secure connection between the local computer and the remote computer over the network; and integrating a desktop of the remote computer on a display of the local computer.

Systems, applications, methods and computer readable media are provided for accessing and using at least one remote computer from a local computer over a public network, including the steps of: centrally authenticating, at a location having a public address, a first computer having a first, firewall protected private address; creating a first firewall compliant connection between a publicly addressed connection server and the first computer upon authentication of the first computer; establishing a second firewall compliant connection between the publicly addressed connection server and a second computer having a second firewall protected private address; establishing a private-to-public-to-private communications tunnel, wherein the connection server routes communications from the first computer through the first firewall compliant connection and the second firewall compliant connection to the second computer, and from the second computer through the second firewall compliant connection and the first firewall compliant connection to the first computer; and performing at least one further step selected from the group consisting of: integrating a file structure of accessible files accessed at the second or first computer, into a file structure contained at the first or second computer, respectively; at least one of integrating a desktop of the second computer on a display of the first computer and integrating a desktop of the first computer on a display of the second computer; and directly operating the second computer from the first computer or the first computer from the second computer, wherein the computer that is directly operated is selected from the group consisting of: home appliances, video equipment, audio equipment, printers, fax machines, office equipment, medical devices, vehicles, cameras, RFID equipment, laboratory equipment, manufacturing machinery, GPS equipment, and devices having one or more embedded microprocessors.

One or more connection servers may be included in the system, to operatively connect the computers across the wide area network. The connection server may provide at least one to all of authentication, authorization, security, encryption and point-to-multipoint communications functionalities to the system.

Alternatively, computers may be connected over the wide area network without the use of a connection server, and with or without a VPN.

Data transmissions may be managed to minimize bandwidth and may be temporally and/or spatially compressed.

The computers may be located behind differing firewalls and still not impede the functionality or ease of use of the present invention.

Systems, methods and computer readable media are provided for remotely accessing data from a remote storage device, including the steps of: requesting data from a first computer in a first location to a remote storage device associated with a second computer in a second location, wherein the first and second computers are connected over a wide area network; and displaying a file structure, on a display of the first computer, of data stored on the remote storage device, wherein the displayed file structure may be interacted with by a user of the first computer in the same manner that a user of the second computer would interact with the file structure locally on a display of the second computer and wherein at least one of the first and second computers is located behind a firewall.

Persistent network connections are provided between the computers so that if a connection is broken, the connection is automatically reconnected to resume functioning without any requirement for reconfiguration required to resume normal functioning.

Access may be predicated upon a remote user logging in with password data and/or meeting biodata security requirements.

The computers may be interconnected securely over a wireless connection, without the need to configure a firewall. The computers may be connected via a VPN.

Computer readable media containing instructions for operating one or more computers to carry out the methods described herein are also covered by the present invention.

These and other features and advantages of the invention will be apparent from the detailed description below.

BRIEF DESCRIPTIONS OF THE DRAWINGS

The invention will be more fully understood by reference to the following drawings, which are for illustrative purposes only.

DETAILED DESCRIPTION OF THE INVENTION

Figure 1:
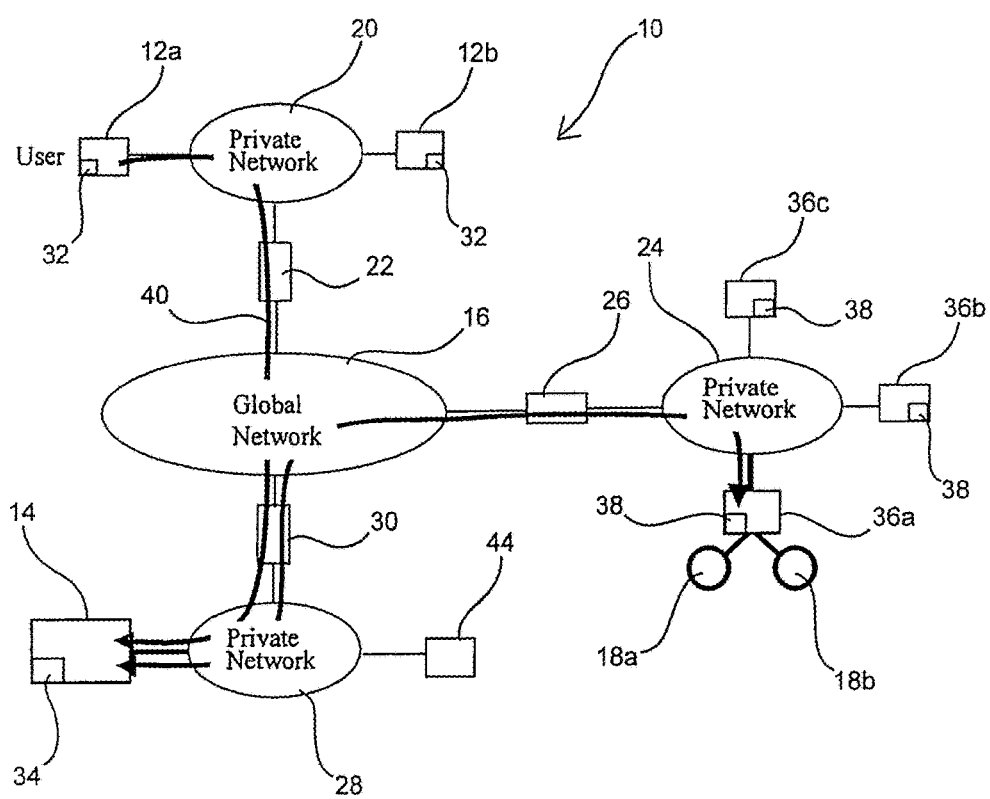
FIG. 1 is a functional block diagram of an access and control system for network-enabled devices in accordance with the invention.

Before the present systems, methods and recordable media are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "a device" includes a plurality of such devices and reference to "the computer" includes reference to one or more computers and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

As used herein, the term "remote device" or "remote computer" refers to a computer and/or device connected to a computer or network-enabled device located somewhere other than where the user is currently located, and which the user wishes to access data from and/or remotely control. Note that a remote computer or remote device includes not only computers/devices that are accessible by the local user only over a public network, but also may also be a computer/device that is in the same room as the local user or in another location accessible by a local or private network.

The term "remotely located device" or "remotely located computer" refers to a remote computer or remote device that can only be accessed by a local computer by connecting through a public network.

The term "local device" or "local computer" refers to a device or computer which is physically in the same location of the user and physically accessible to the user to use in performing the functions that it was designed for. All local devices/local computers also have the ability to access remote devices/remote computers using the functionality provided by the present invention.

The term "computer" generally refers to a minicomputer, a microcomputer, a UNIX® machine, mainframe machine, personal computer (PC) such as INTEL®, APPLE®, or SUN® based processing computer or clone thereof, laptop computer, notebook computer, tablet computer, personal digital assistant (PDA), cellular phone with wide area network access capability, MP3 player or other portable entertainment device having wide area network access capability (e.g., iPod, available from Apple, Cupertino, Calif.), or other network-enabled portable digital devices, or other appropriate computer, such as home appliances, televisions, stereos, audio and/or video equipment, including recording devices, security devices, printers, fax machines, other office equipment, medical devices, vehicles cameras, GPS equipment, laboratory equipment, RFID equipment, manufacturing machinery, and other devices having an embedded processor capable of wide area network access, or any machine having or locally associated with storage capability, and having the ability to access a wide area network to function with the present invention.

The term "client computer" generally refers to a computer locally connected to a local device, although it may also function as a computer locally connected to a remote device when a user is accessing it from another location.

Similarly, the term "network-enabled device" may refer to a local device or a remote device, depending upon the function that it is currently supporting.

Also, "device control computer" may be used to refer to means for controlling a remote device, although it may also be used to refer to means for controlling a local device, when the user is physically located in and operating from the location of such means.

The term "DataClient" or "device module" refers to the computer or client computer that incorporates or is directly connected to the physical drive or other storage means that is being shared with other computers or clients.

The term "UserClient" or "user module" refers to a computer or client computer that is accessing the data stored by the "DataClient" or "device module".

The term "storage device" refers to any type of device capable of storing digital information, such as hard drives, CD-ROM/RAM, DVD ROM/RAM, floppy disks, solid state storage devices such as flash memory or the like, tape or optical storage, or any other storage device capable of storing digital data. A storage device may be contained in or locally operatively connected with any of the types of computers or devices mentioned above, including, but not limited to PC's MP3 players or other personal, portable digital devices, laptop computers, personal digital assistants (PDA's), cellular phones, home appliances, video equipment audio equipment, printers, fax machines, other office equipment, medical devices, vehicles, cameras, RFID equipment, laboratory equipment, manufacturing machinery, GPS equipment, and other devices that may be controlled by a microprocessor, such as devices with embedded microprocessors, for example, or may be a network-attached storage device, wherein the storage device is connected to one or more computers over a network.

A "personal identification device" or "personal security device" refers to a device configured to personally authenticate a user prior to authorizing a secure connection. Such a device may require security information such as user names, passwords, etc., Alternatively, or additionally, authentication data may optionally include biometric data, such as fingerprint identification or retinal scan identification, or the like. A camera may be configured with a user computer to perform a retinal scan of the user for similar verification. Further alternatively, a computer may be provided with a touch screen from which fingerprint data may be read upon a user's touching of the screen. Another alternative is to provide a portable device or "portable security device", such as a USB stick or other portable storage device, that must be integrated into the network connection in order to authenticate the session. Such a portable security device may include an encrypted key or other code that is essential to gaining authorization. Additionally or alternatively, such a portable security device may also include one or more types of biometric sensor. For example, a USB stick may be provided with a sensor to read and input the user's fingerprint information when the user plugs the USB stick into a local computer and touches the sensor appropriately.

"File" refers to any data structure which can be stored in a hard-drive or other storage device such as CD-ROM/RAM, DVD ROM/RAM, floppy disk, solid state storage device such as flash memory or the like, tape or optical storage, or any other storage device capable of storing digital data. Thus the term "file" also includes folders, directories, and the like.

The term "file overhead information" refers to file attributes or properties that may include but are not limited to file name, file size, folder status, last modified date, created date, etc. Every file or folder has file overhead information that can be used by local applications to get properties information about a file or a folder.

The term "file data" refers to the actual binary content of a file. For example, the file data of a JPEG picture file refers to the actual bits that are in the file which represent the picture.

The term "Delta" refers to differential data that is the result of calculating differences between files that is performed for difference compression used in updating a file according to the present invention (e.g., the difference between the file as originally downloaded and the file as edited, or the difference between the currently edited file and the most recent previously edited filed).

The term "Inverse Delta" refers differential data that is the result of calculating differences between files in the reverse order to the way in which a "Delta" file is calculated. Inverse Delta files may be used to revert back to an earlier version of file data.

Disclosed herein are systems, applications, methods and recordable media for efficient data access and control of storage devices between multiple computers connected by a wide area network or by a local area network. It will be appreciated that apparatus disclosed herein may vary as to configuration and as to details of the parts, and that methods may vary as to details and the order of the acts, without departing from the basic concepts as disclosed herein. It should also be understood that the terminology used herein is for the purpose of describing particular embodiments only, and is not intended to be limiting, since the scope of the present invention will be limited only by the appended claims. The invention may be embodied in networked computer systems in a variety of configurations other than the exemplary configurations shown herein. The invention is described primarily in terms of use with HTTP (Hypertext Transfer Protocol), but may be used with other data transfer protocols. It should also be apparent to those skilled in the art that various functional components of the invention as described herein may share the same logic and be implemented within the same circuit, or in different circuit configurations.

Referring now to FIG. 1, an access and control system 10 for network-enabled devices is shown which permits seamless firewall-compliant interconnectivity between one or more client or user computers 12a, 12b, that may be operatively coupled to a connection server 14 via a public or global network 16 such as the Internet, with one or more network-enabled devices 18a, 18b that are also operatively coupled to connection server 14 via global network 16. As shown, client computers 12a, 12b are part of a first private network 20 that is operatively coupled to the global network 16 through a firewall element 22. Network-enabled devices 18a, 18b are located within a second private network 24 that is operatively coupled to global network 16 via firewall element 26. In this example, connection server 14 is located within a private network 28 that is operatively coupled to global network 16 via firewall element 30. A more complete and detailed description of the access and control system 10 shown in FIG. 1 can be obtained in the parent application Ser. No. 09/608,685.

User or client computers may comprise any standard computer such as a minicomputer, a microcomputer, a UNIX® machine, mainframe machine, super computer, personal computer (PC) such as INTEL®, APPLE®, or SUN® based processing computer or clone thereof, personal digital assistant (PDA), wearable computer, cellular phone with wide area network access capability, MP3 player or other portable entertainment device having wide are network access capability (e.g., iPod, available from Apple, Cupertino, Calif.), laptop, notebook, or other appropriate computer, such as home appliances, televisions, stereos, audio and/or video recording devices, security devices and other devices having an embedded processor capable of wide area network access. Client computers may also include typical computer components (not shown), such as a motherboard, central processing unit (CPU), memory in the form of random access memory (RAM), hard disk drive, display adapter, other storage media such as diskette drive, CD-ROM, DVD-ROM, CD-RW, DVD-RW, flash-ROM, tape drive, PCMCIA cards and/or other removable media, a monitor, keyboard, mouse and/or other user interface, a modem, network interface card (NIC), Bluetooth® and/or other conventional input/output devices. In many embodiments, client computers comprise conventional desktop or "tower" machines, but can alternatively comprise portable or "laptop" computers, notebook computers, handheld personal digital assistants (PDAs) or "palm-top" computers, tablet computers, cellular phones capable of browsing Web pages, "dumb terminals" capable of browsing Web pages, internet terminals capable of browsing Web pages such as WEBTV®, or other Web browsing or network-enabled devices.

Each user or client computer 12a, 12b may comprise, loaded in its memory, an operating system (not shown) such as UNIX®, WINDOWS® 98, WINDOWS® ME, WINDOWS® 2000, LINUX®, System X®, Apple OS®, PALM OS® or the like, or a proprietary operating system. Each client computer 12a, 12b may further have loaded in memory a Web Browser program (not shown) such as NETSCAPE NAVIGATOR®, INTERNET EXPLORER®, AOL®, or like browsing software for client computers. In accordance with the invention, client computers 12a, 12b may each comprise programming 32 stored in memory that allow client computers 12a, 12b to send instructions to network-enabled devices 18a, 18b as requests through connection server 14, and receive data from network-enabled devices 18a, 18b via responses through connection server 14, as described further below. Programming 32 may be the form of electronically, optically, or magnetically stored code or other form of computer readable stored code, that is loaded in the RAM, cache, or other memory of client computers 12a, 12b.

Connection server 14 may be any standard data processing device or computer, including a minicomputer, a microcomputer, a UNIX® machine, a mainframe machine, super computer, a personal computer (PC) such as an INTEL® based processing computer or clone thereof, an APPLE® computer or clone thereof or, a SUN® workstation, wearable computer, or other appropriate computer. Connection server 14 may include conventional components (not shown) such as a motherboard, central processing unit (CPU), random access memory (RAM), hard disk drive, display adapter, other storage media such as diskette drive, CD-ROM, DVD-ROM, CD-RW, DVD-RW, flash-ROM, tape drive, PCMCIA cards and/or other removable media, a monitor, keyboard, mouse and/or other user interface means, a modem, network interface card (NIC), and/or other conventional input/output devices. Multiple connection servers 14 may be used, as described further below.

Connection server 14 has stored in its memory a server operating system (not shown) such as UNIX®, WINDOWS® NT, NOVELL®, SOLARIS®, LINUX® or other server operating system, or a proprietary sever operating system (e.g., NEC or other proprietary system). Connection server 14 also has loaded in its memory web server software (also not shown) such as NETSCAPE®, INTERNET INFORMATION SERVER™ (IIS), or other appropriate web server software loaded for handling HTTP (hypertext transfer protocol) or Web page requests from client computers 12. Connection server 14 may also comprise a connection handler array 34 configured to establish and maintain a plurality of network connections between a plurality of clients 12 and one or more network-enabled devices 18. A connection server usable with the invention is also described in U.S. Pat. No. 6,499,054, which is incorporated herein by reference thereto.

Network-enabled devices 18a, 18b may comprise any equipment or components capable of receiving instructions and transmitting data via a computer network. Such devices may comprise, in specific embodiments, scientific instruments, chemical reactors, video security devices, surgical devices, power meters, power generators, automobiles or other transit machinery, home appliances, manufacturing equipment, office equipment, or like devices, hard drives, solid state memory such as flash memory and the like, other storage media drives, such as CDR/RW and DVDR/RW drives, floppy drives, network attached storage devices, other optical or tape drives, routers, or electronic control modules for virtually any remotely controllable equipment, that are configured to be controlled, monitored or otherwise operated remotely. More than one network-enabled device 18a, 18b may be used in association with each device control computer 36a, 36b, 36c. Network-enabled devices 18a, 18b may be configured for "plug-and-play" operation wherein the devices 18a, 18b may be coupled to device control computer 36a, 36b, 36c without interruption of operation of device control computer 36 or other network-enabled devices 18a, 18b coupled to the device control computer 36a, 36b, 36c via hardwire, USB, IEEE 1394, "FIREWIRE®", RS-232, Parallel, PCI, BLUETOOTH®, 802.11 (a, b or g) or like interface.

The system 10 as shown in FIG. 1 represents only one of many possible networked computer systems that is usable with the invention. Only two client computers 12a, 12b are shown within private network 20, and two network-enabled devices 18a, 18b and three device control computers 36a, 36b, 36c are shown within private network 24, for reason of clarity. Additional private networks, client computers, device control computers and network-enabled devices may be present in the system 10. Further, both user or client computers and network-enabled devices may be present within each private network. Numerous variations will suggest themselves to those skilled in the art. Still further, the present invention is applicable to only two computers across a wide area network such as the Internet, with or without firewall protection.

Figure 2:
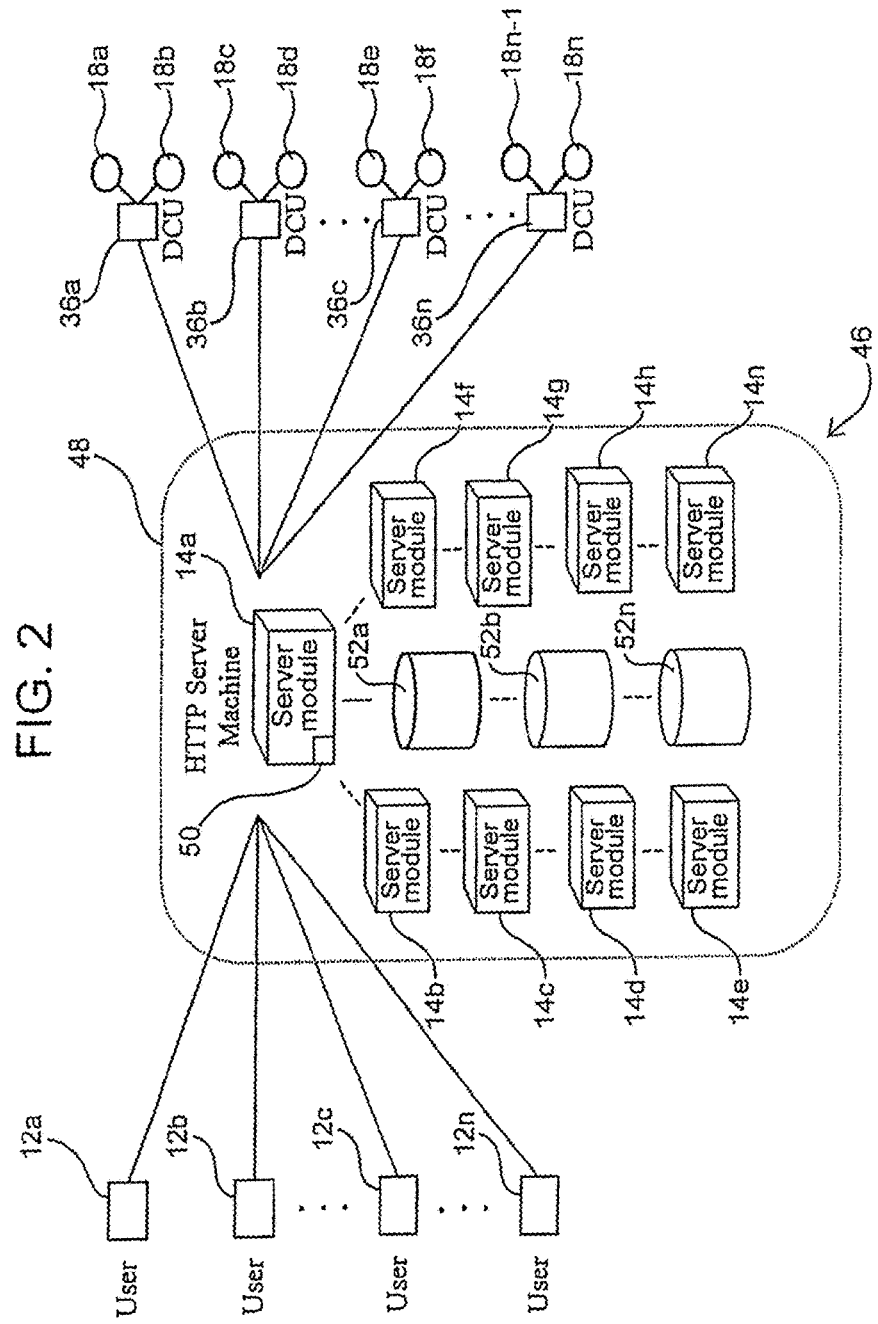
FIG. 2 is a functional block diagram of an access and control system in accordance with the invention with distributed control infrastructure that includes a plurality of connection servers.

FIG. 2 shows another arrangement of an access and control system 46 that may be used in accordance with the present invention for efficient remote access and control of storage devices. The system 46 includes a distributed control infrastructure 48 comprising a plurality of connection servers 14a, 14b, 14c, 14d, 14e, 14f, 14g, 14h, 14n. Connection servers 14a-14n each include the same components and software described above for the connection server 14 of FIG. 1. As shown, connection server 14a is configured to operate as a primary connection server, with each of servers 14b-14n operatively coupled to connection server 14a. A complete detailed description of the arrangement shown in FIG. 2 can be obtained in the parent application Ser. No. 09/608,685.

Figure 3:
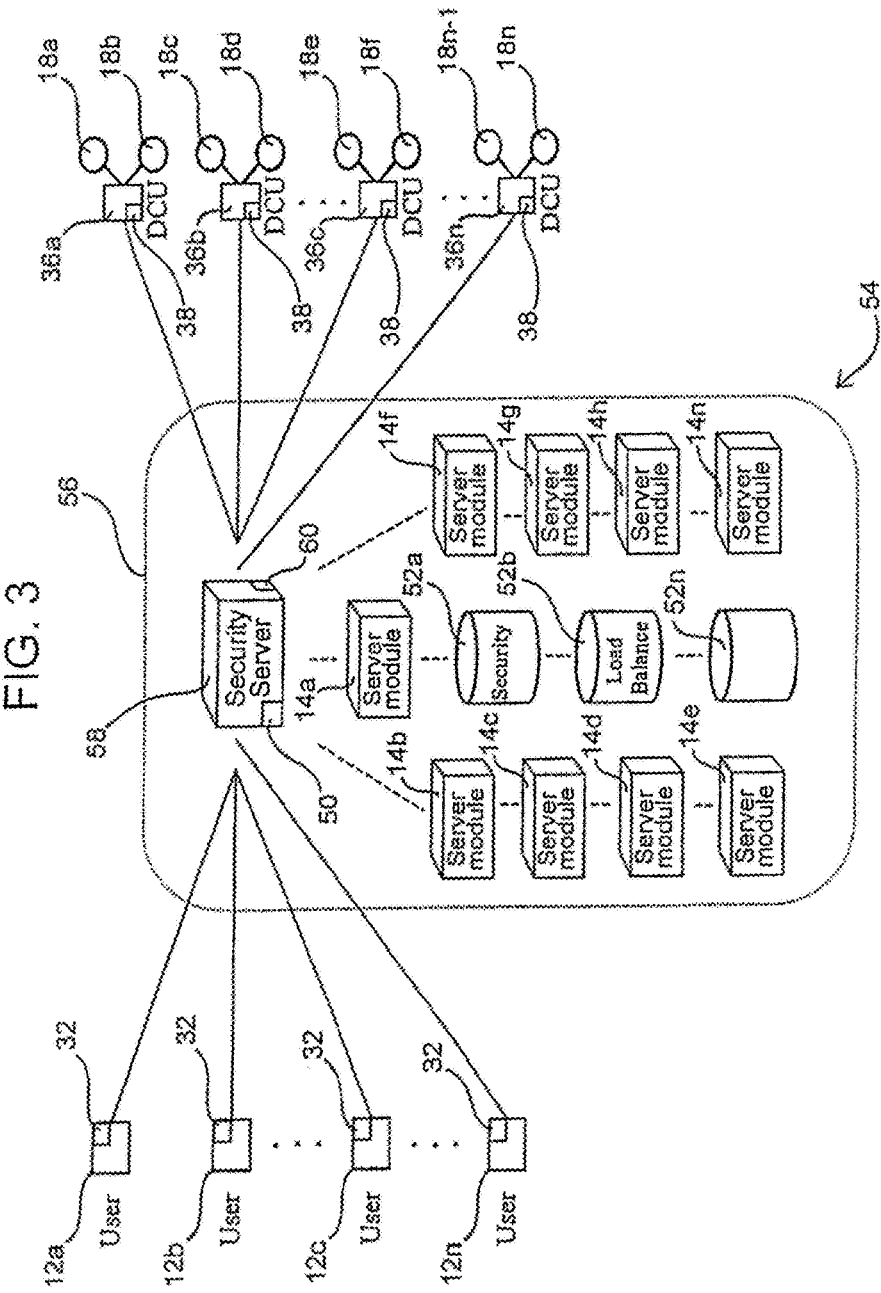
FIG. 3 is a functional block diagram of an alternative embodiment access and control system in accordance with the present invention wherein a security server is used in a connection server system.

FIG. 3 illustrates still another example of an access and control system 54 that may be used in accordance with the present invention for efficient remote access and control of storage devices. As in the examples of FIGS. 1 and 2, the present invention does not require the access and control system shown in FIG. 3, or any access control system, as the invention may be practiced point to point between two computers over a wide area network for example, with or without the use of a VPN. However, use of an access and control system as described greatly enhances the versatility of the present invention for use across private networks having diverse firewalls installed, for example. The system 54 has a distributed control infrastructure 56 with a security server 58. A plurality of connection servers 14a, 14b, 14c, 14d, 14e, 14f, 14g, 14h, 14n are operatively coupled to security server 58, and to a plurality of databases 52a, 52b, 52n. Security server 58 may be operatively coupled to a plurality of client computers 12a, 12, 12c, 12n, and to a plurality of device control computers 36a, 36b, 36c, 36d and network-enabled devices 18a, 18b, 18c, 18d, 18e, 18f, 18g, 18n via the Internet or other wide area network in the manner described above. Client computers 12a-12n each include the stored client process or program 32, and device control computers 36a-36n, each including device control process or program 38. The distributed control infrastructure 56 is scalable and reconfigurable according to the number of client computers, device control computers and network-enabled devices that are present in the system 54. Additional security servers 58 may be included in infrastructure 56 as well, if needed. A complete detailed description of the arrangement shown in FIG. 3 can be obtained in the parent application Ser. No. 09/608,685.

Figure 4:
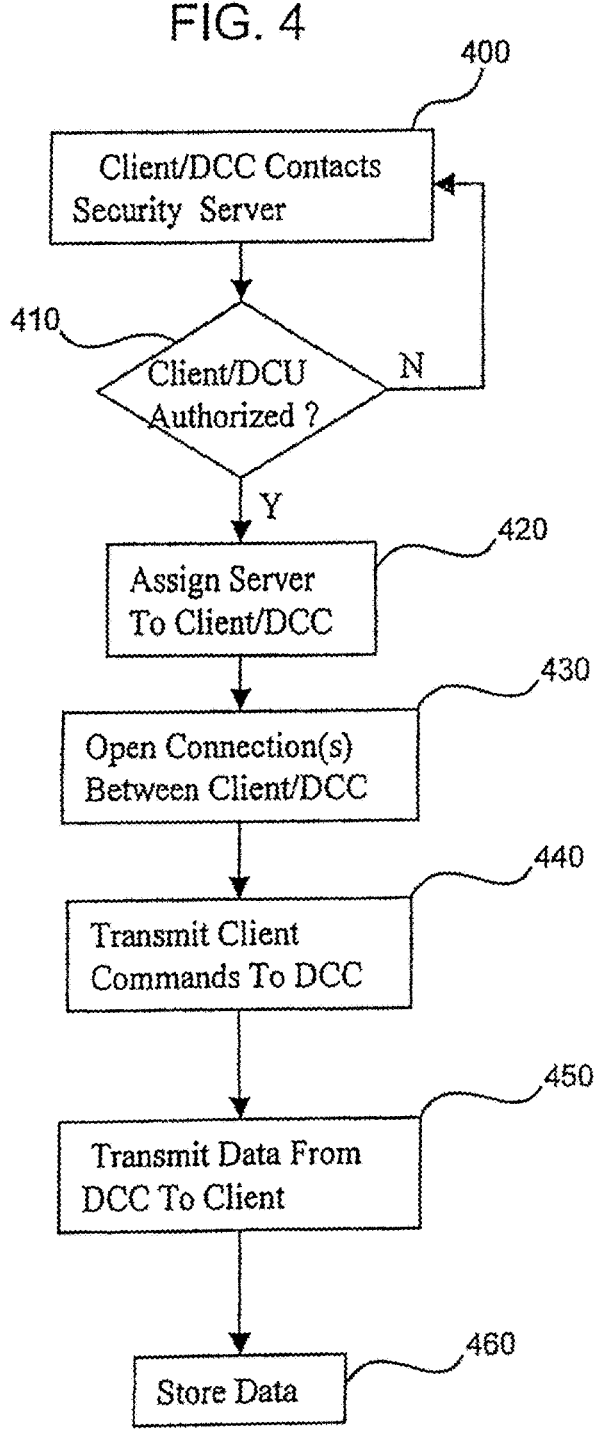
FIG. 4 is a flow chart illustrating user authentication and connection aspects of the methods of the invention.

FIG. 4 is a flowchart describing the operation of the access and control system 54. The events of FIG. 4, it should be understood, apply to both client computers 12a-12n as well as device control computer computers (DCC) 36a-36n. In event 400, the user of a client computer 12a-12n contacts security server 58 of distributed control infrastructure 56. This contact may be carried out in a conventional manner by establishing a TCP socket connection between a client computer 12a-12n and the security server 58. At event 410, a determination is made by security server 58 as to whether or not the user of client computer 12a-12n that made contact in event 400 is authorized. The authentication application 60 on security server 58 checks to see whether or not the authentication data in the request has been altered during transmission from client computer 12a-12n, and whether or not the authentication data verifies the user of client computer 12a-12n. If authorization is denied, event 400 may be repeated. An HTTP response may be sent by the security server to the client computer 12a-12n advising the user of a security error, and that access to any network-enabled devices 18a-18n is denied. If the user of client computer 12a-12n is authorized in event 410, encryption keys may be prepared and verified for the user. Following user authorization, event 420 is then carried out. The authorization process and security aspects of the system 54 are discussed in greater detail below with reference to the flow chart of FIG. 5.

At event 420, security server 58 assigns one of the connection servers 14a-14n to the user of client computer 12a-12n that was authorized in event 410. In event 430, a connection is made between the connection server 14a-14n assigned in event 420, and the network-enabled device 18a-18n selected by the user authorized in event 410. This connection may be in the form of a TCP socket connection between the security server 58 and the network-enabled device 18a, 18n selected by the user.

In event 440, client computer 12a-12n transmits instructions or commands to a network-enabled device 18a-18n, and in event 450, network-enabled device 18a-18n transmits data to client computer 12a-12n. These events may occur concurrently, as full duplex connections are established. Client process 32 on client computers 12a-12n periodically sends HTTP requests to connection server 14a-14n that include embedded command data. Device control process 38 on device control computer 36a-36n also sends periodic HTTP requests to connection server 14a-14n with embedded data from network-enabled device 18a-18n. At event 460, data from network-enabled device 18a-18n (or client computer 12a-12n) is stored in database 52a-52n. This data may be used by other authorized users in the same session or in subsequent sessions. A complete detailed description of the arrangement shown in FIG. 4 can be obtained in the parent application Ser. No. 09/608,685.

Figure 5:
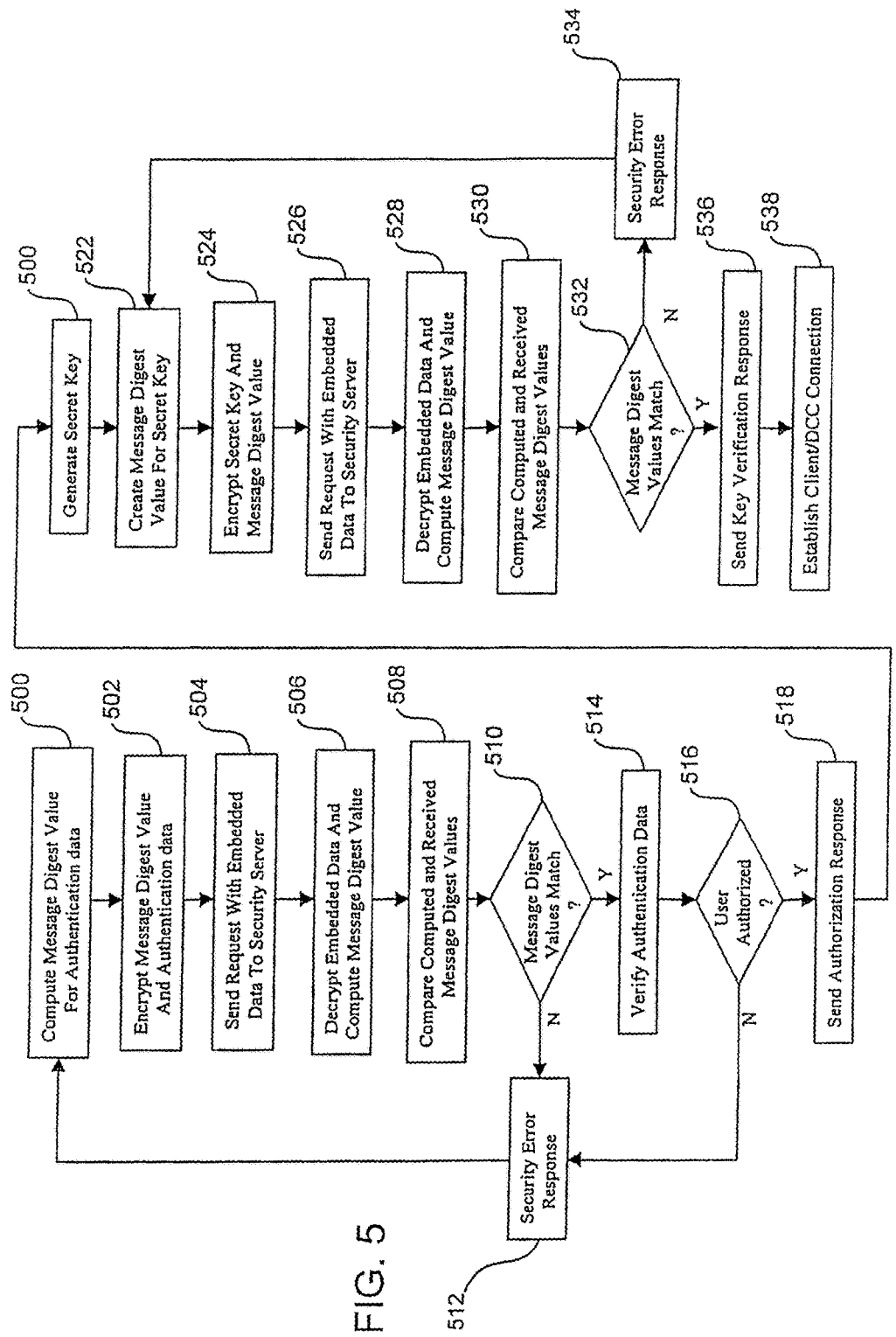
FIG. 5 is a flow chart illustrating authorization and security aspects of the methods of the invention

FIG. 5 is a flow chart illustrating user authentication and encryption aspects of a control and access system that may be used for efficient remote access and control of storage devices in accordance with the present invention. Although the events of FIG. 5 are again described in terms of use with client computers 12a-12n, it should be understood that the same events may be carried out in association with device control computers (DCC) 36a-36n. The events shown in FIG. 5 may occur concurrently with event 410 of FIG. 4, and illustrate in more detail one embodiment of an authentication system that may be used with the invention.

In event 500, process 32 on client computer 12a-12n prepares authentication data that is to be sent to security server 58, and calculates a message digest value for the authentication data. At event 502, process 32 on client computer 12a-12n encrypts the authentication data, together with the message digest value calculated in event 100, using the public key for security server 58. At event 504, process 32 on client computer 12a-12n sends an HTTP request to security server 58 that includes, embedded therein, the encrypted authentication data and message digest value.

At event 506, security server 58 receives the HTTP request from client computer 12a-12n, and authentication process 60 on security server 58 decrypts the embedded authentication data and corresponding message digest value from the HTTP request using its private key. The authentication process 50 separates the authentication data from the message digest value received in the request. At event 508, authentication process 60 computes or calculates a message digest value from the decrypted authentication data and compares the computed message digest value to the received message digest value of event 506. At event 510, authentication process 60 determines whether the computed message digest value and the received message digest value match. If the computed message digest value and received message digest value are not identical, the authentication data from client computer 12a-12n has been altered or corrupted while en route to security server 58, and event 512 is carried out. If the computed message digest value and received message digest value match or are identical, event 514 occurs.

At event 512, an HTTP response with a security error message may be sent to client computer 12a-12n by security server 58. The message may advise the user of client computer 12a-12n that authentication data could not be validated, and invite the user of client computer 12a-12n to re-submit the authentication data. After a selected number of failed authentication attempts by client computer 12a, 12n by repeating events 500-510, a message may be sent to client computer 12a-12n to advise the user thereof that the desired network connection is not available due to authentication failure. If the computed message digest value and received message digest value match in event 510, the received authentication data has not been altered or corrupted, and event 514 is carried out. Authentication process 60 on security server 58, in event 514, verifies the authentication data recovered in event 506 by comparing the username and password received from client 12a-12n to security information stored in database 52a. This security information includes known usernames and passwords for valid or permitted users of client computers 12a-12n. Alternatively, or additionally, authentication data may optionally include biometric data, such as fingerprint identification or retinal scan identification, or the like. For example, a key used by a user to input keystrokes through a computer may be equipped to read the fingerprint of the user to verify that the fingerprint data read matches the identity of the purported user. A camera may be configured with a user computer to perform a retinal scan of the user for similar verification. Further alternatively, a computer may be provided with a touch screen from which fingerprint data may be read upon a user's touching of the screen. Another alternative is to provide a portable device, such as a USB stick or other portable storage device, that must be integrated into the network connection in order to authenticate the session. Such a portable security device may include an encrypted key or other code that is essential to gaining authorization. Additionally or alternatively, such a portable security device may also include one or more types of biometric sensor. For example, a USB stick may be provided with a sensor to read and input the user's fingerprint information when the user plugs the USB stick into a local computer and touches the sensor appropriately. Such biometric monitoring may be one time, upon initiating a user session/active subscription, or may be configured to periodically recheck the biometric data to ensure that another user has not replaced the original, authenticated user.

At event 516, authentication process 60 makes a decision as to whether the username and password information data represents an authorized user. If the user is authorized, event 518 occurs. If the user is not authorized, event 512 may be carried out. Event 512 may involve an HTTP response to client computer 12a-12n with a security error message as noted above. At event 518, security server 58 sends an HTTP response to client computer 12a-12n with a message indicating that the user of client computer 12a-12n is authorized to proceed and that network communication to the desired network-enabled device 18a-18n and/or other authorized client computer(s) 12a-12n may be established.

At event 520, client process 32 generates a secret key for encryption of data to be transmitted from client computer 12a-12n to the network-enabled device 18a-18n and/or other authorized client computer(s) 12a-12n of interest. Alternatively, device control computer 36a-36n may generate its own secret key for transmission of data from network-enabled device 18a-18n to client computer 12a-12n. In event 522, process 32 on client computer 12a-12n generates or computes a message digest value for the secret key generated in event 520. In event 524, client process 32 encrypts the secret key generated in event 520, and the message digest value for the key that was generated in event 522, using the public key for security server 58.

In event 526, process 32 on client computer 12a-12n sends an HTTP request to security server 58 that includes the encrypted secret key and corresponding message digest value embedded within the request. At event 528, security server 58 receives the HTTP request from client computer 12a-12n that was sent in event 526, and authentication process 60 on security server 58 decrypts the embedded secret key data and corresponding message digest value from the HTTP request using its private key. The authentication process 50 separates the secret key data from the message digest value for the secret key that was received in the request. At event 530, authentication process 60 calculates or computes a message digest value for the decrypted secret key, and compares the computed message digest value to the received message digest value for the secret key from event 528.

At event 532, authentication process 60 determines whether the computed message digest value and the received message digest value for the secret key are matched. If the computed message digest value and received message digest value do not match, the secret key transmitted from client computer 12a-12n in event 526 has been altered or corrupted during transmission to security server 58, and event 534 occurs. If the computed message digest value and received message digest value match or are identical, event 536 is carried out. At event 534, security server 58 may send an HTTP response to client computer 12a-12n with a security error message. The message may advise the user of client computer 12a-12n that the received secret key could not be verified, and may invite the user to repeat events 522-526. After a selected number of failed attempts by client computer 12a-12n to send a verifiable secret key, a message may be sent to client computer 12a-12n to advise the user that the desired network connection cannot be made.

At event 536, an HTTP response may be sent by security server 58 to client computer 12a-12n advising the user thereof that the secret key has been received and authenticated. At this point, the security server 58 has successfully authenticated the client computer 12a-12n and has securely received the secret key for encryption of data from the client computer 12a-12n. At event 538, a connection may be established between the authenticated client computer 12a-12n and network-enabled device(s) 18a-18n and or other client computer(s) 12a-12n. This event may be carried out by a selected one of connection servers 14a-14n according to the load balancing algorithm shown in FIG. 6 and described below.

Numerous variations on the events, and variations in the order of events of FIG. 5 are possible, as will be clear to those skilled in the art. A complete detailed description of the security applications that may be employed with the present invention can be obtained in the parent application Ser. No. 09/608,685. It is further noted that security applications are not essential to the present invention, but will likely be employed to ensure that secure communications are maintained.

Figure 6:
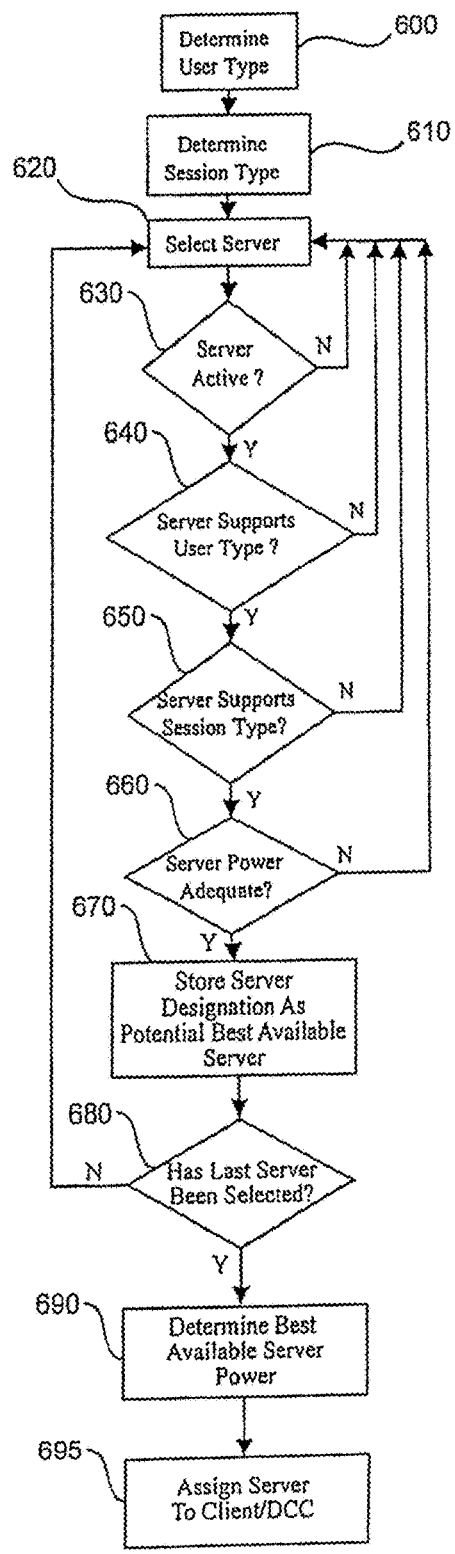
FIG. 6 is a flow chart illustrating load balancing aspects of server selection in the methods of the invention.

FIG. 6 is a flow chart illustrating the functionality of a load balancing system that may be employed with an access and control system, if optimizing server time is a concern. At event 600, load balancing application 50 on security server 58 determines the User Type or User Types that will be involved in a session. Identification information recovered from requests by security server 58 may be compared to stored User Type data in database 52b to make the User Type determination for the session. At event 610, load balancing process 50 determines the Session Type for the connection to be created. This determination may, as noted, be based on identification data requests from client computer 12a-12n and/or device control computer 36a-36n, which may be compared to Session Type information in database 52b.

Server selection is next carried out by load balancing process 50 in event 620. Server selection may be based on a comparison of User Type and Session Type information determined in events 600, 610, to Server Type information in database 52b. At event 630, load balancing process 50 determines whether or not the connection server 14a-14n selected in event 620 is active. If the selected server has active status, event 640 occurs. If the selected server is not active, event 620 is repeated and a different connection server 14a-14n is selected. Selection of servers 14a-14n may occur according to a predefined selection order, so that any particular server will not be selected twice by the process before each server has been selected and analyzed for purposes of load balancing.

At event 640, load balancing process 50 determines whether or not the connection server 14a-14n selected in event 620 supports the particular User Type determined in event 600. If the selected connection server 14a-14n is not configured to support the User Type determined in event 600, event 620 is repeated and another, different connection server is selected. If the selected connection server does support the User Type, event 650 occurs. At event 650, load balancing process 50 determines whether or not the connection server 14a-14n selected in event 620 supports the particular Session Type determined in event 610. If the selected connection server 14a-14n is not configured to support the Session Type determined in event 610, event 620 is repeated and a different connection server is selected, and events 630-650 are repeated. If the selected connection server does support the User Type, event 660 is carried out.

At event 660, load balancing process 50 determines whether or not the connection server 14a-14n selected in event 620 has adequate Power to support the connections that will be involved in the session to be established. If the selected connection server 14a-14n has insufficient Power to handle the connections that will be involved in the session to be established, event 620 is repeated and a different connection server 14a-14n is selected. If the selected connection server 14a-14n does have sufficient Power, event 670 is carried out, wherein the designation for that selected server is temporarily stored to be used in a comparison of potentially available servers to determine which is best for load balancing purposes. At event 680 it is determined whether all of the servers have been selected and analyzed at this stage for load balancing purposes. If the last server has not yet been selected, processing returns to event 620 where the next server is selected. If the last server has been selected already, processing goes to event 690.

At this point, there may still be multiple connection servers 14a-14n available that will meet the requirements of the session to be established. In event 690, a determination is made is to which of the selected connection servers 14a-14n stored at event 670 has the best available power level for the contemplated session. If only one server was stored at event 670, then this server is determined to have the best available server power by default. This event in selecting a connection server 14a-14n implements efficient utilization of the connection servers 14a-14n. Since each connection server 14a-14n can support many simultaneous connections, this calculation takes advantage of the statistically calculated average Power usage that is expected for each connection.

After determining the server with the best available server power in event 690, the server determined as such is assigned to the current session/client/DCC. At event 695, having determined the best connection server 14a-14n for the upcoming session, the connection server 14a-14n is assigned to the client computer(s) 12a-12n and device control computer(s) 36a-36n and device(s) 18a-18n that will be involved in that session. A complete detailed description of the load balancing applications that may be employed with the present invention can be obtained in the parent application Ser. No. 09/608,685.

Figure 7:
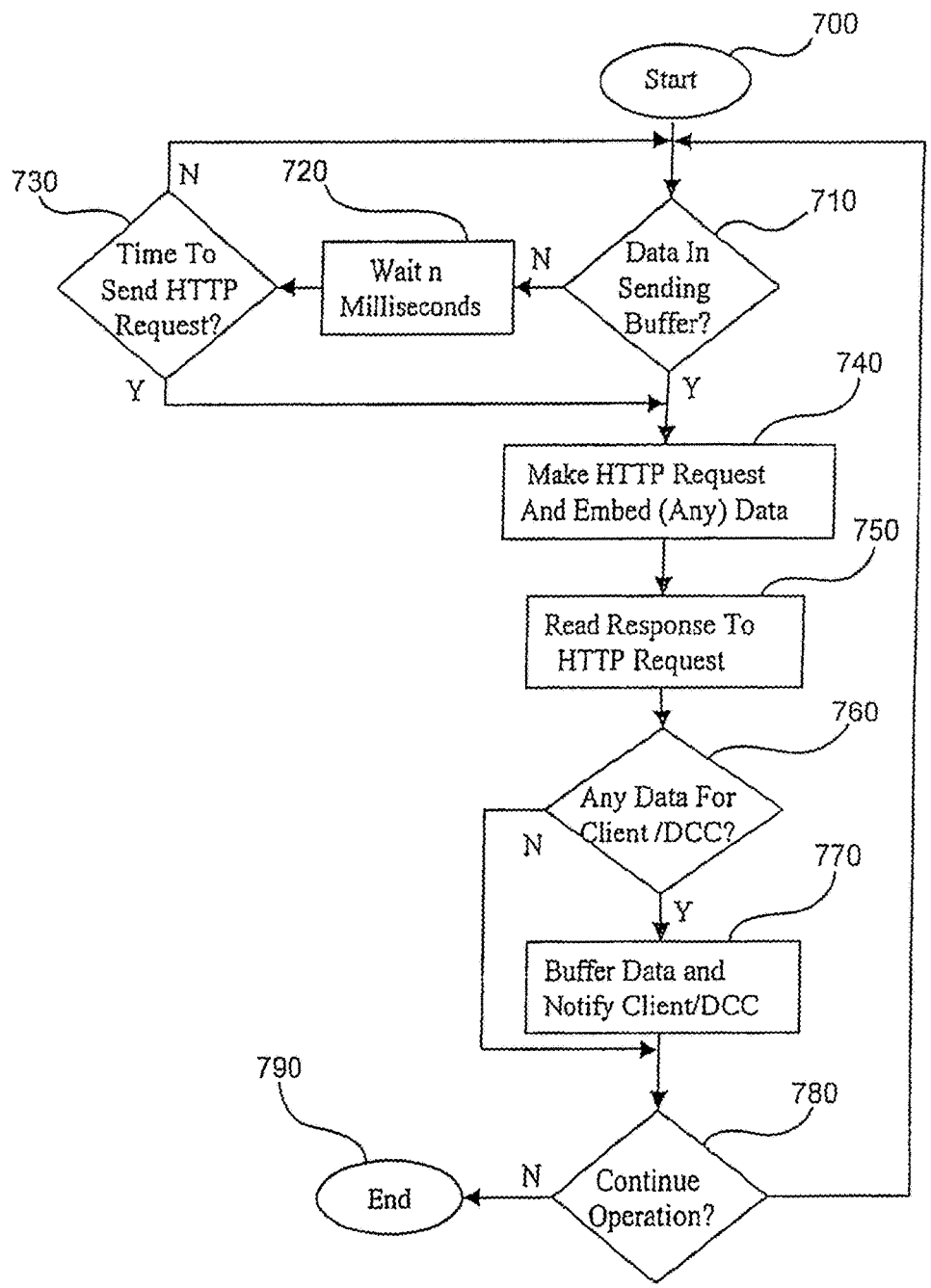
FIG. 7 is a flow chart illustrating operation of a client process and device control computer process in accordance with the invention.
Figure 8:
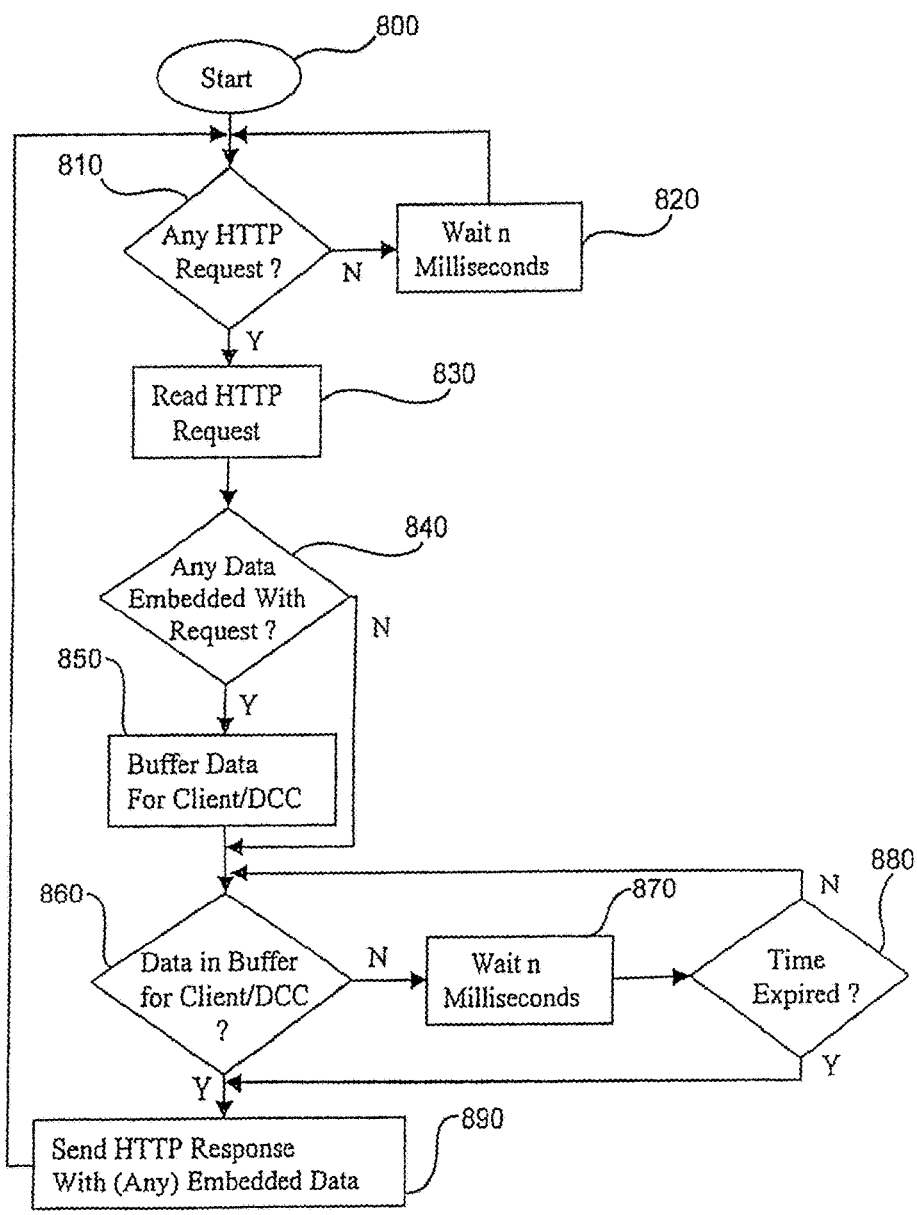
FIG. 8 is a flow chart illustrating operation of a connection server process in accordance with the invention.

Referring now to FIGS. 7 and 8, examples of processes of data transfer between client computer(s) 12a-12n and device control computer(s) 36a-36n and their coupled network-enabled devices are described. As noted throughout the specification, processes of data transfer which are described are also applied to transfers between client computers 12a-12n, as well as transfers between device control computers 36a-36n. Data transfers are carried out by client process 32 and device control process 38 in the manner shown in the flow chart of FIG. 7, and by the connection server process 34 as shown in the flow chart of FIG. 8.

Referring now more particularly to FIG. 7, data transmission using client process 32 and device control process 38 is shown. In event 700, the data transmission events start. Event 700 may occur, for example, after the authentication and secret key generation and verification events of FIG. 5, and the load balancing connection server selection events of FIG. 6 have been completed. At event 710, client process 32 determines whether or not client computer 12a-12n has any data to send to network-enabled device 18a-18n. This event is carried out by checking a sending buffer (not shown) in the memory of client computer 12a-12n wherein are stored data that is to be sent to network-enabled device 18a-18n. If no data is present in the sending buffer, events 720 and 730 occur. If data for network-enabled device 18a-18n is present in the sending buffer, event 740 is carried out. Client process 32 maintains communication with connection server 14a-14n by periodically sending HTTP requests to connection server 14a-14n. If no data was found in the client computer sending buffer in event 710, client process 32 waits for a selected period of time, i.e., n milliseconds, in event 720. This waiting process allows the processor of client computer to perform other tasks in a multitasking environment. The system is persistent, in that HTTP requests are sent at maximum predefined intervals regardless of whether any data is sent from the sending buffer along with the request.

If, in event 730, it is time to send an HTTP request to connection server 14a-14n, event 740 is carried out. If not, event 710 is repeated.

At event 740, client process prepares and sends an HTTP request to connection server 14a-14n. If data for network-enabled device 18a-18n was present in the sending buffer in event 710, this event may additionally comprise embedding that data in the HTTP request. The data may be encrypted using a secret key prepared in the manner described above. The data embedding may, for example, be carried out using the HTTP POST method. At event 750, client process 32 reads an HTTP response from connection server 14a-14n.

At event 760, client process 32 determines whether or not there is any embedded data from network-enabled device 18a-18n for client computer 12a-12n within the HTTP response of event 750. If there is embedded data in the HTTP response, event 760 occurs. If there is no embedded data in the response, event 780 occurs. At event 770, data embedded in the HTTP response of event 750 is read and is buffered in the memory of client computer 12a-12n for use, and client computer 12a-12n is notified that data from network-enabled device 18a-18n has been received. If the data from network-enabled device 18a-18n is encrypted, this event may additionally comprise decryption of the data.

At event 780, client process determines whether or not the operation of data transfer is to be continued. This determination may be made according to instructions received from the user of client computer 12a-12n, or according to an HTTP response from connection server 14a-14n that includes a notification that the connection to network-enabled device 18a-18n has been broken. If the operation is to be continued, events 710-780 are repeated. If the operation will not be continued, the operation is terminated at event 790.

The connection server 14a-14n may serve as a bridging medium between client computer(s) 12a-12n and network-enabled device(s) 18a-18n (via device control computer(s) 36a-36n), between client computer(s) 12a-12n and client computer(s) 12a-12n, and between device control computer(s) 36a-36n and device control computer(s) 36a-36n. Data from the device(s) 18a-18n that are destined for client computer(s) 12a-12n are posted to the connection server 14a-14n using an HTTP request as previously described. Receiving the HTTP request, the connection server 14a-14n then temporarily stores or buffers any data from the request in its memory (i.e., the sending buffer). The next time an HTTP request comes from client computer 12a-12n (in this example, but as noted above, a request could also be from another device control computer 36a-36n), the connection server 14a-14n retrieves the data from the sending buffer and sends the data to client computer 12a-12n (or other device control computer 36a-36n), along with the response for the HTTP request Like the request sending procedure described above, the response sending procedure is also efficiently adaptive for sending data substantially as quickly as it has been received, with persistent polling also being provided by the HTTP requests which occur at least within a maximum defined interval, regardless of whether any data is being sent along with the HTTP request. Connection server 14a-14n may also maintain a central log file that logs all of the transmissions and where and what time they are received, as well as where they are sent and at what time, for example. The central log file may be as detailed as to provide each keystroke that was executed and by which user at which computer. The central log file may be searchable and used as an audit trail by searching the central server to identify what has been done and by whom.

The central log file can serve as a valuable monitoring tool, such as for medical applications, or laboratory protocols, or even classroom or child monitoring, for example.

Referring next to FIG. 8, event 800, the data transfer process is initiated. This event may occur, for example, once at least two users (e.g., at least two client computers 12a-12n, at least two device control computers 36a-36n, or, as in this example, at least one client computer 12a-12n and one device control computer 36a-36n) have been authorized and connections to the at least two users have been opened. In this example, the at least two users are referred to as a client computer 12a-12n and a device control computer 36a-36n, although it is again emphasized that the present invention is not limited to such communications.

At event 810, connection server process 34 determines whether or not any HTTP request has been received from client computer 12a-12n (or device control computer 36a-36n). If no HTTP request has been received, event 820 is carried out wherein process 34 waits for a selected period of time, and then repeats the query of event 810. If an HTTP request has been received, event 830 occurs. At event 830, connection server process 34 reads the HTTP request received in event 810.

At event 840, connection server process 34 determines whether or not any data to or from client computer 12a-12n is embedded within the HTTP request. If there is data embedded in the request, event 850 is carried out. If there is no data with the HTTP request, event 860 occurs. At event 850, any data present in the HTTP request is buffered in the sending buffer (not shown) of connection server 14a-14n. This data may be encrypted, as noted above, but need not be decrypted by connection server 14a-14n.

At event 860, connection server process 34 determines if there is any data present for client computer 12a-12n from network-enabled device 18a-18n. If no data is present in the sending buffer, connection server process 34 waits for n milliseconds in event 870. Connection server process 34 maintains communication with client computer 12a-12n by periodically sending HTTP responses to client computer 12a-12n, which are responsive to the periodic HTTP requests from client computer 12a-12n described above. In event 880, connection server process 34 determines if the time period for sending a periodic HTTP response to client computer 12a-12n has expired. If the time period has expired, event 890 is carried out. If the time period has not expired, event 860 is repeated. Like the request sending procedure described above, the response sending procedure is also efficiently adaptive for sending data substantially as quickly as it has been received, with persistent polling also being provided by the HTTP requests which occur at least within a maximum defined interval, regardless of whether any data is being sent along with the HTTP request. Since data in the sending buffer can be sent with the HTTP response at a time which is any multiple of "n milliseconds" upon until the maximum time interval at which an HTTP response must be sent, this acts as an "adaptive polling" of the sending buffer. That is, if data appears in the sending buffer at 30 milliseconds where "n" is 10 milliseconds, then the data will be sent in an HTTP response at the 30 milliseconds time. Alternatively, if data does not appear in the sending buffer until 70 milliseconds, the HTTP response is not sent until the 70 millisecond mark, when the data is sent along with the response.

In event 890, an HTTP response is sent to client computer 12a-12n by connection server 14a-14n. If any data was present in the connection server sending buffer for client computer 12a-12n, this data is embedded within the HTTP response.

Following event 890, events 810-880 are repeated. If a connection to client computer 12a-12n has been terminated, the events of FIG. 8 may be terminated. Once again, it must be understood that the events of FIG. 8 as described above are also carried out in association with device control computer 36a-36n, as well as client computer 12a-12n, to provide data communication therebetween.

The events of FIG. 7 and FIG. 8 are described in more complete detail in parent application Ser. No. 09/608,685.

Figure 9:
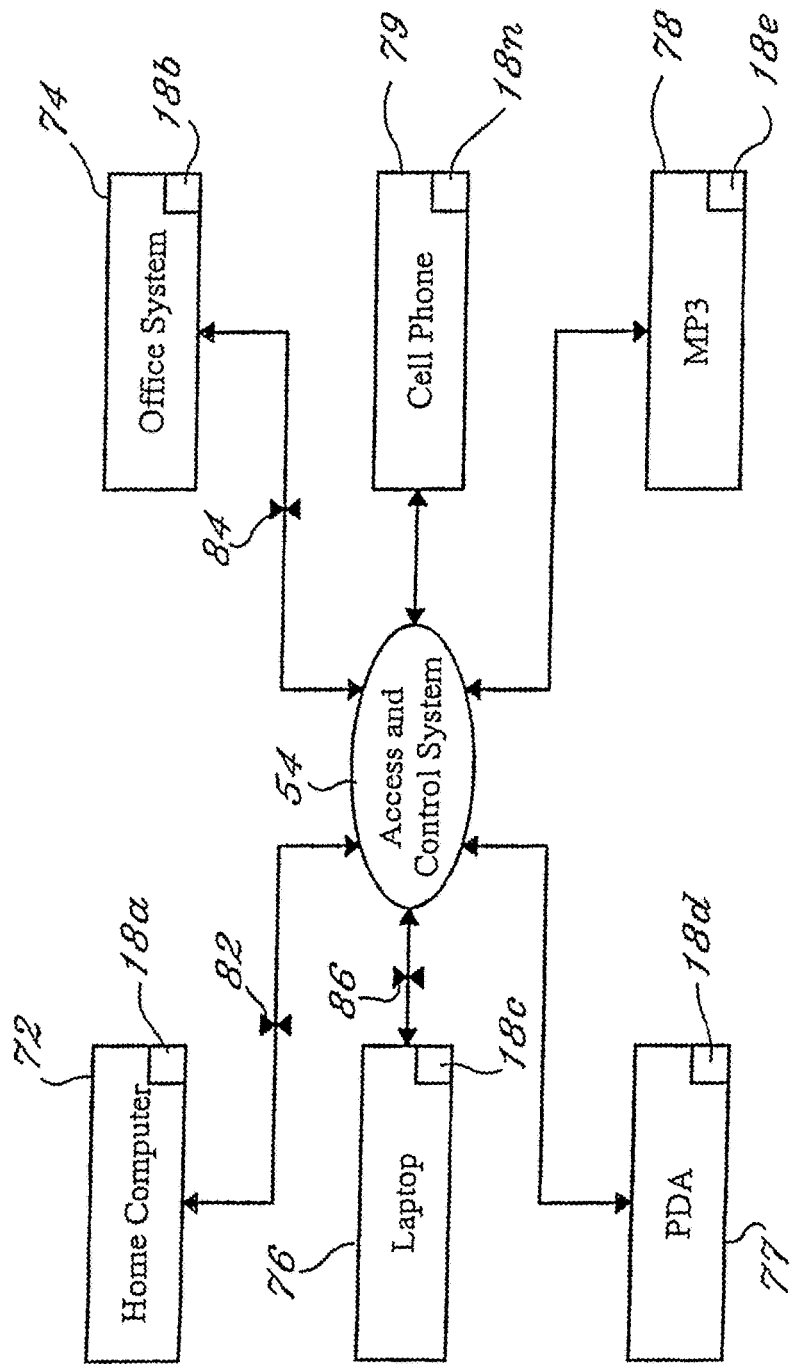
FIG. 9 is a functional block diagram of an embodiment of the present invention illustrated for use in providing seamless and secure access to data and devices whether or not they are firewall protected.

FIG. 9 shows an embodiment of the present invention for providing managed, peer-to-peer, seamless and secure access to data and devices whether or not they are firewall protected, since the present invention enables access to firewall protected computers and devices as described above. Shown schematically, are various computers/network-enabled devices, each of which includes or is locally connected to at least one device capable of storing data and accessing that data for use by an associated processor. For example, a home computer may be a standalone computer with storage device 18a or may be a plurality of networked computers on a home network, either hardwired or wireless. Many network accessible home computers/computer networks are also currently set up behind a firewall 82 for enhanced security. Office System 74 will also typically be located behind a firewall 84, which is typically different from firewall 82. Office System 82 may be limited to the user's work computer and its associated storage device(s) 18b, or accessibility may extend further to one or more servers networked on the Office System 82, or even to other user computers that are networked, depending upon the user's needs and permission settings according to the present invention, which will be described in more detail below. In each of the examples described here, although only one data storage device is referred to, it is noted that multiple data storage devices may be employed and accessible via the present invention.

The present arrangement permits access and sharing of data to and from any location throughout the world which is accessible to a network that the devices/computers can communicate over. Although the Internet is the most ubiquitous and common network to be mentioned here, the present invention is not limited to only use over the Internet, as other networks, private as well as public may also employ this functionality. Using the example of the internet, a user on a laptop or other portable computer, who is traveling, for example, can access any of the other devices shown, including home computer 72 and Office System 74 to obtain current, up-to-date files that may be needed, which perhaps the user forgot to take on the trip, or which may have been edited or updated since the time of the user's departure. Further, the present invention allows collaboration, so the remotely located user can collaboratively work with files in other locations, with other users.

Although the example 76 is shown for remote access to files from a site that is located behind a firewall 86, the present invention provides the same functionality for computers/devices which are not located behind a firewall. Thus, for example, a user who is away from his or her main stores of data, may access, use and even download files with a device such as a PDA 77 MP3 player 78 or cell phone 79 with wireless network capability. The security protocol offered by the present invention ensures secure transmissions between such computers/devices, using the security facilities described above. It is noted that the present invention is not limited to the computers/devices shown, but may be used for any network-accessible devices for communicating data files over a network, examples of which include cameras, video and/or audio recording equipment, televisions, factory equipment, instruments, office equipment such as printers, fax machines, scanners, home security equipment, home appliances and others, including those listed above in the specification. Further, also access and control system 54 is shown in the example of FIG. 9, it is noted that any of the other access and control systems or connection servers described herein may be used for this functionality.

Using the secure access and control features of the present invention ensures that only a specified user or users can gain access to data files across the network, and that any information sent is encrypted and secure from theft or reading by unauthorized users. These features are provided even to computers/devices which are not located behind a firewall, even those that access the network via wireless communication. The present invention enables a user to access devices 18$a$-18$n$ of all the computers that a user would normally have access to, from any single location throughout the world where the user has network access, assuming all of the computers also have network access.

It is further noted that any of the computers shown in FIG. 9 may function as a DataClient, the device or devices of which other computers access to share a file or files from. Also, this may be a distributed system. For example, a user from the location of laptop 76 (which is the local computer or UserClient in this example) may access a remote device 18$a$ in DataClient 72 (i.e., home computer) to share a personal financial statement, and also access a second remote device 18$e$ in DataClient 78 (MP3 player) to share a song or two from its personal storage.

Figure 10:
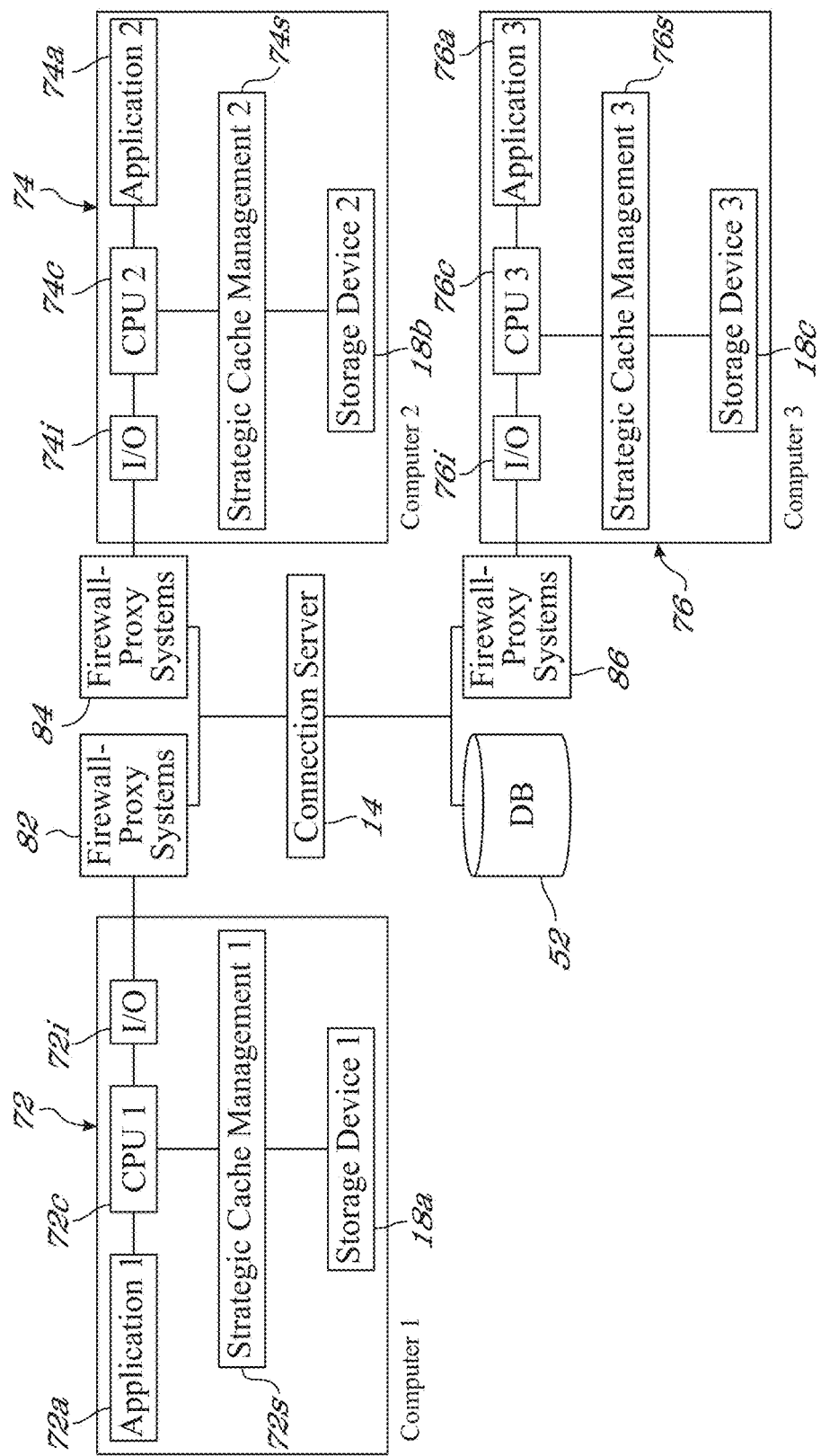
FIG. 10 shows another example of the present invention, in which only three computers/network-enabled devices are shown for simplifying the description thereof.

FIG. 10 shows another example of the present invention, in which only three computers/network-enabled devices 72/18$a$, 74/18$b$, 76/18$c$ are shown for simplifying the description of the functionality. Although FIG. 10 only shows three computers for the purpose of description simplicity, the current invention can be applied to a larger or smaller number of computers. As shown in FIG. 10, each of computers 72, 74 and 76 has its own central processing unit 72$c$, 74$c$ and 76$c$, respectively, storage device 18$a$, 18$b$ and 18$c$, respectively and I/O device 72$i$, 74$i$ and 76$i$, respectively, for network communications. As noted above, any of computers 72, 74 and 76 may be a desktop computer, laptop computer, personal digital assistant, network attached storage system, file server or other computing device that has CPU, storage and connectivity capabilities.

Connection Server 14 is included in the example of FIG. 10 in order to provide authenticated, authorized, secure, encrypted, firewall-compliance and point-to-multipoint collaborative communications among computers 72, 74 and 76 in the manner described above, and where each of the computers may be protected behind a firewall or a proxy system 82, 84, 86 as also described above. It is also understood that the current invention may also be implemented using a VPN that is set-up to allow computers 72, 74 and/or 76 to securely communicate over a wide area network. Furthermore, in such cases where security is not a concern, the present invention may be implemented without a VPN. In the latter two cases described, computers 72, 74 and 76 directly communicate among each other, without use of a connection server 14.

The example of FIG. 10 also implements database 52 to manage user information and user devices. Although database 52 is shown to be connected to connection server 14, variations of this are possible, such as, where database 52 may be connected to any one or more devices or computers accessible through a computer network, for example.

The present system provides a remote file system that utilizes a strategic data caching management that is designed for optimized performance in a wide area network. The system utilizes local storage devices, such as storage devices 18$a$, 18$b$ and 18$c$ in the example of FIG. 10, that have high-performance data access capabilities to provide local upper layer applications, such as applications 72$a$, 74$a$ and 76$a$ in the example of FIG. 10, with similar if not the same high performance data access to the remote storage devices. Strategic cache management can be implemented as a software program that manages operations of cached data on a local storage device. As shown in FIG. 10, strategic cache management 72$s$, 74$s$ and 76$s$ are implemented to manage operations of cached data on local storage devices 18$a$, 18$b$ and 18$c$, respectively.

Figure 11:
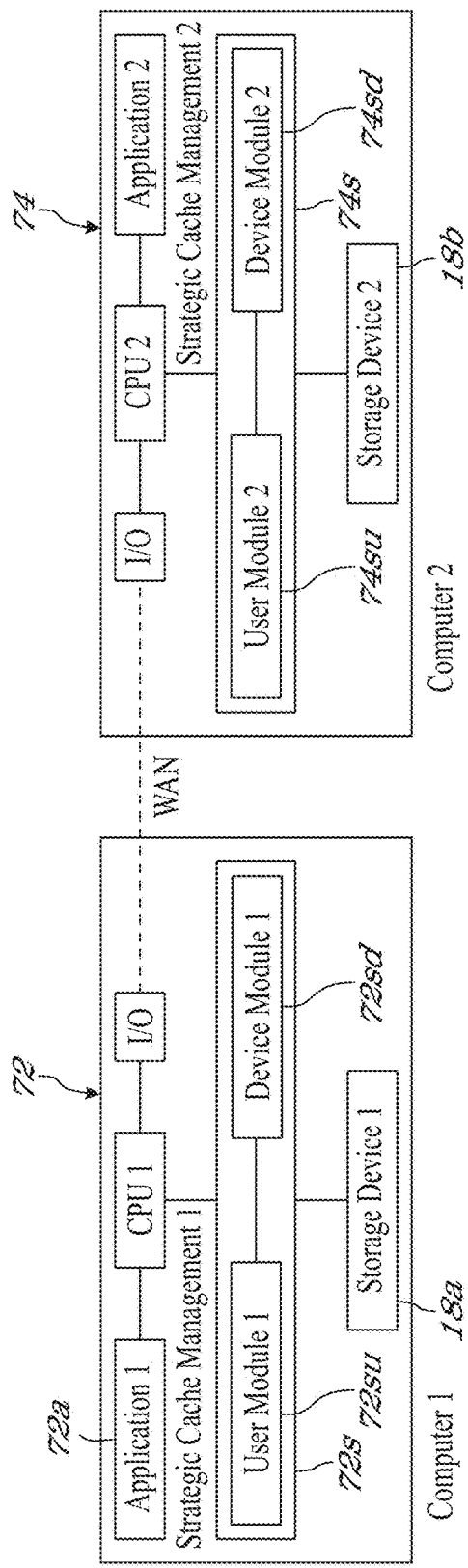
FIG. 11 is a block diagram for use in illustrating functionalities of strategic cache management according to the present invention.

Functionalities of the strategic cache management may be divided into two parts, as exemplified in FIG. 11. In this example, only two computers 72, 74 are shown, again for purposes of simplicity of explanation. Computers 72 and 74 are connectable across a wide area network by any of the means described above with regard to FIG. 10, for example, via a connection server 14, or directly connected, with or without a VPN. Also as noted previously, more than two computers can be so connected and function according to the principles described hereinafter. As shown, strategic cache management application or process 72 and strategic cache management application or process 74 are each separated between a user module 72$su$ and 74$su$, respectively, to manage UserClient operations, and a device module 72$sd$ and 74$sd$, respectively, to manage DeviceClient operations.

User module 72$su$, 74$su$ may be a software module that accesses remote data on a remote storage device (i.e., in the example shown, user module 72$su$ accesses data from remote storage device 18$b$ and user module 74$su$ accesses data from remote storage device 18$a$) and manages caching operations of the remote data on its local storage device (18$a$ for user module 72$su$, 18$b$ for user module 74$su$). Device module 72$sd$, 74$sd$ may be a software module that manages a local storage device (i.e., in the example shown, device module 72$sd$ manages local storage device 18$a$ and device module 74$sd$ manages local storage device 18$b$) that is being accessed and shared by user modules 72$su$, 74$su$ over the network. Device modules 72$sd$, 74$sd$ also manage caching operation of the local data on their local storage devices for the purpose of optimizing data sharing capabilities. For example, as shown in FIG. 11, a user may operate application 72$a$ (e.g., Windows Explorer®) to access remote storage device 18$b$ at computer 74 over a wide area network. In that case, application 72$a$ would make data access requests to user module 72$su$, which in turn will manage the process of data caching and data transmission from device module 74$sd$ at computer 74.

User modules 72$su$, 74$su$ may implement standard file system functionalities, hence users can operate the user modules using standard operating system interfaces such as Windows Explorer®, Netscape Navigator® or the like to navigate and browse through the remote file system. Consequently, local applications such as Windows Explorer®, Microsoft Word®, Adobe Acrobat®, etc., may seamlessly interface with a user module 72$su$, 74$su$ as if it is an additional storage device. Local applications may request a user module to perform file system functionalities that may include but are not limited to: create file, create directory, delete file, delete directory, open file, close file, file exists, flush file, get file information, set file information, is read only, read file, seek file, rename file, search, copy, write file and truncate file, as well as viewing and performing any of the aforementioned functionalities on previous versions of files. One example of facilitating user modules 72*su*, 74*su* to function like additional storage devices to their local operating systems to provide standard file system interfaces for local applications is to implement Server Message Block or Common Internet File System (SMB/CIFS) server functionalities. Although the current invention describes the use of SMB/CIFS protocol, it can be understood that other implementations that allow the user module to provide file system functionalities to the local operating system may alternatively be applied. SMB/CIFS protocol is an application-layer protocol that can provide drive-sharing functionality over a computer network. SMB/CIFS protocol can be carried by various data transport protocol such as TCP/IP. Although the current invention describes the use of TCP/IP protocol for SMB functionalities, other implementation varieties may also use other data transport protocols that have similar characteristics.

In cases where a local operating system is already running an SMB server that listens on a standard TCP/IP port number for the SMB server (e.g., port 445), the user module may need to be configured to provide SMB/CIFS functionalities by listening on a different TCP/IP port number that is not being used. Consequently, to allow local SMB clients to have TCP/IP connections to user module 72*su*, 74*su* on the standard SMB server port, it is necessary to perform network address translation of IP data packets. A networking driver may be used to filter all of the inbound and outbound IP packets on the local system and perform network address translation. Such filtering capability may be developed using Microsoft NDIS (Network Driver Interface Specifications) Network Driver, available from Microsoft, Inc., Redmond, Wash., for example, or using WinpkFilter 2.0 from NTKernel.com, for example. Other available network drivers may alternatively be used.

Referring to user module 72*su* as an illustrative example, a virtual IP address and port number (e.g., 10.10.10.10, port: 445) may be designated for user module 72*su*. However, user module 72*su* may actually listen on port 18025 on the local operating system, to avoid conflicts with an existing SMB server on port 445. All IP packets with the virtual IP address and port number are modified to have the local IP address and port number that the user module uses. Continuing the example, IP packets that contain virtual IP address and port number such as: 10.10.10.10 port 445 are modified to have 127.0.0.1 port 18025. Hence, IP data packets bound for the virtual IP address are routed instead to local user module 72*su* that runs the SMB server. In summary, to the local operating system 72, local user module 72*su* may appear to be a remote file system by use of the virtual network address.

A user module running SMB/CIFS server functionalities may also be automatically mapped as a network drive to the local operating system. For example, user module 74*su* may represent the "C:" drive on remote computer 74, but be mapped to the "V:" drive on the local system 72. To help users to better identify storages devices on remote computers, such drive mapping information may be stored in a database 52, with a system such as shown in FIG. 10; hence such information is retrievable via the network to provide consistent definition throughout the entire system. For example, an Office Computer 72 drive may always appear to be the "V:" drive on the a Home Computer 74 and on a Laptop Computer 76.

Additionally, database 52 may also store file-access permission management information. Such permission management information can be downloaded and stored in the user module's local cache to determine what data access functionalities that the particular user module can perform and to which files or directories may be accessed on which remote device modules. Database 52 may also store authentication data, including, but not limited to usernames and passwords, biometric data, and the like. Accordingly, a system administrator (or user that controls a private personal network) may centrally set up permissions and/or authentication data for users of the network, as well as centrally store such data. Functionality may extend to the ability to set up groups or classes of users, where each group or class has a different set of permissions levels and where all users in the same group or class are assigned that same set of permissions levels assigned to the group or class. Corrections to such data can then also be sent out point-to-multipoint to all users/members of the network affected by the centralized changes that have been made. Likewise, software updates (e.g., to the system) and/or messages to the users may be sent out point-to-multipoint to all users/members of the network affected by the centralized changes that have been made.

Figure 12:
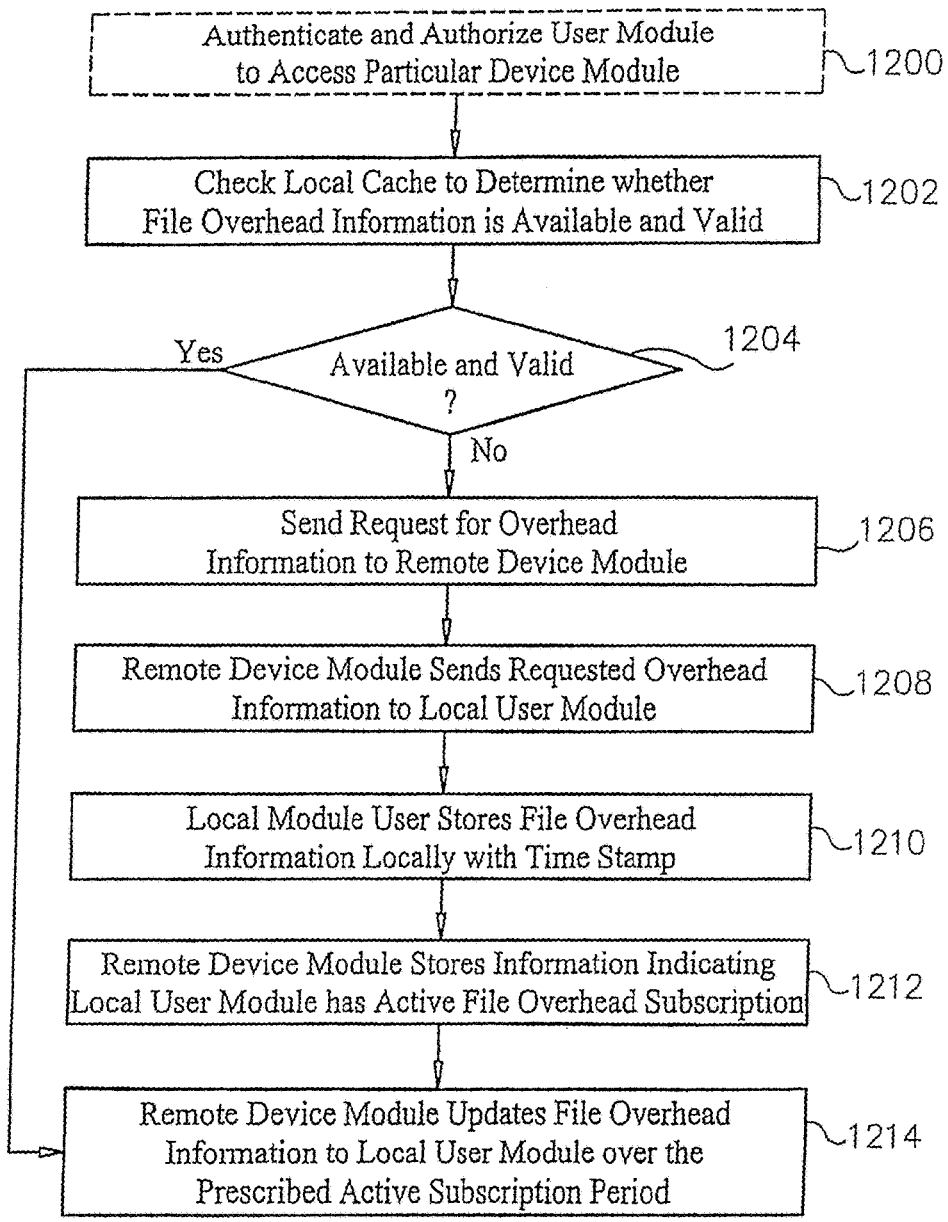
FIG. 12 is a flow chart illustrating a file overhead data management process in accordance with the present invention.
Figure 13:
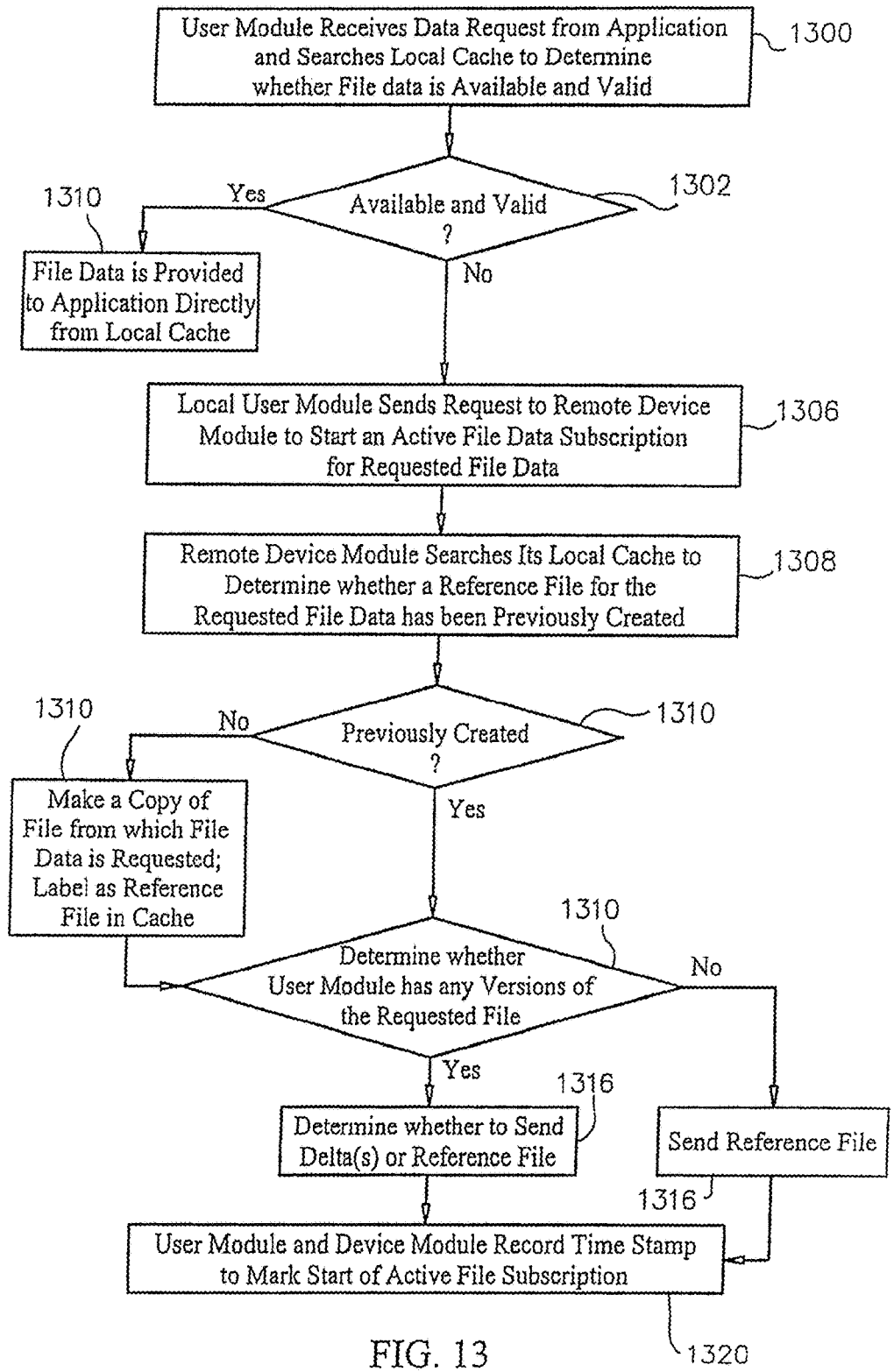
FIG. 13 is a flow chart illustrating a file data management process in accordance with the present invention.

A process of strategic data caching will be more fully understood by reference to the flow charts of FIGS. 12 and 13, as well as to FIGS. 10 and 11. FIG. 12 describes a file overhead data management process, while FIG. 13 describes a file data management process. Referring to FIG. 11, an example is described in FIG. 12 where a user employs application 72*a* (for example, Windows Explorer®, Microsoft Word®, or Adobe Acrobat®, etc) to access remote storage device 18*b* which is local to computer 74. Initially, user module 72*su* may be authenticated and authorized to access device module 74*sd* via connection server 14 in instances where a connection server is part of the system. Otherwise, authentication and authorization protocols may be implemented on the computers 72, 74. Application 72*a* makes data access requests to the local user module 72*su* that provides SMB/CIFS server functionalities.

Targets of the data access requests that are made can generally be classified into two main categories: file overhead information and file data. File overhead information pertains to file attributes or properties that may include but are not limited to file name, file size, folder status, last modified date, created date, etc. Every file or folder has file overhead information that can be used by local applications to get properties information about a file or a folder. For example, Windows Explorer® may use file overhead information to list or display directory data structures for user navigation purposes. On the other hand, file data is the actual binary content of a file. For example, the file data of a digital photograph contains the actual jpeg binary data that can be used for graphical display and/or printing.

The present invention provides a file subscription process that utilizes the strategic data caching system to improve data access performance of remote storage devices over a wide area network. Particularly, the file subscription process is designed to optimize network bandwidth requirements for transmission and validation of both file overhead information and file data between user modules and device modules. The strategic data caching system also allows latency of the overall remote data access activities to be significantly improved. Both bandwidth and latency improvements are especially important for an efficient sharing performance of remote storage devices in a wide area network environment.

File subscriptions can also generally be divided into two categories called file overhead subscription and file data subscription. A user module may use a file overhead subscription to serve data access requests by local applications pertaining to overhead information of a file or a folder. A user module may use a file data subscription to serve data access requests pertaining to binary data content of a file.

Event 1202 initiates a file overhead subscription process, where the user may wish to browse through files and directory(ies) of the remote file systems of storage device 18*b*. Once user module 72*su* receives a request by the user to search or list contents of a particular directory, it may first check its local cache to find whether such file overhead information is available and valid at event 1202. Validity is determined by whether or not the user module 72*su* is currently engaged in an active subscription to the device module of the remote storage device holding the information that the user desires to access. If an active subscription period is running, then it is determined at event 1204 that the file overhead information is available and valid, as determined by a date time stamp contained in the local cache and a predefined active subscription period, both of which are described below. In this case, the process goes to event 1214. If it is determined at event 1204 that the file overhead information requested is not available or valid, the user module 72*su* sends a request over the network to device module 74*sd* to subscribe to authorized overhead information of the associated directory and its contents in storage device 18*b*, at event 1206.

In response to the request at event 1206, if user module 72*su* is authorized and has permission to receive the requested file overhead information, device module 74*sd* sends the requested file overhead information to user module 74*su* over the network at event 1208. Once transmission of the overhead information has been completed, user module 72*su* stores the file overhead information along with its arrival time stamp in the local cache of storage device 18*a* at event 1210. Hence subsequent requests to the particular directory can be served directly from the local cache. At event 1212, device module 74*sd* also stores in its local cache (of storage device 18*b*), file overhead subscription information that specifies that user module 72*su* has an active file overhead subscription of the associated directory and its contents. As part of the file overhead subscription information, device module 74*sd* also stores the estimated arrival time stamp of the associated file overhead information for user module 72*su* after the successful transmission.

The length (i.e., time duration) of an active subscription may be defined for the entire system. For example, if the length of an active subscription has been defined to be 30 minutes, then starting with the time of the estimated arrival time stamp and for the next 30 minutes, device module 74*sd* is responsible to send any updates to user module 74*su* regarding the file overhead information of the associated directory and its contents, as device module 74*sd* and user module 72*su* are engaged in an active subscription over that time period, see event 1214. Consequently, starting on the arrival time stamp and for the next 30 minutes, in this example, user module 72*su* can trust the file overhead information stored in its local cache to be valid and can be directly used to serve subsequent data access requests to the particular directory or its contents. Either user module 72*su* or device module 74*sd* may cancel the file overhead subscription at any time during active subscription status, for example, in an emergency instance where one of the computers involved needs to be shut down.

The file subscription process described reduces network bandwidth requirements and latency of the overall remote data access activities, both of which are especially advantageous when working across a wide area network. One of the features that provides these advantages, is that even if the user uses local applications to continuously or repeatedly makes data access requests to a remote directory in remote storage device 18*b*, user module 72*su* only needs to make a network request once during the period of the active subscription, since after the initial request, the information is stored locally at the site of the user. When the file overhead subscription is no longer active, whether due to cancellation by the local user module 72*su*, cancellation by device module 74*sd* or expiration of the active subscription period, for example, device module 74*sd* stops updating user module 72*su* with changes on file overhead information associated with the particular directory and its contents. File overhead information may be accessed and subscribed to based on one directory at a time, per a user request. Alternatively, other methods of access and subscription may be implemented to further optimize transmissions of file overhead information. For example, device module 74*sd* may provide file overhead information not only on the requested directory and its contents, but also on parts or all of the sub-directories and their contents stored in storage device 18*b* which are authorized and permitted to be sent to user module 72*su*. Further, determinations as to which files/directories of which overhead information will be additionally sent may be made based on user specifications, structures of the associated directory or probabilistic analysis of directory-browsing behavior patterns.

The user, through the use of local applications, such as application 72*a*, for example, may make changes to the downloaded file overhead information as well as create or delete files and folders. When this occurs, user module 72*su* sends any such modifications, creations and deletions to device module 74*sd*. After receiving the modifications, creations and/or deletions, device module 74*sd* consults the file overhead subscription information to identify any other connected user modules that are actively subscribed to the modified file overhead information. Subsequently, modifications of file overhead information are transmitted by device module 74*sd* to all of the identified user modules. Further, device module 74*sd* may also listen to file access events from its local operating system to detect any changes to files and folders that are actively subscribed by connected user modules. Device module 74*sd* transmits any locally detected file overhead modifications (detected through the described listening) to all connected and actively subscribed user modules.

When the user in the example above browses through remote directory structures as described above, user module 72*su* may only subscribe to file overhead information of the associated files and folders that are browsed. At this point, the local application 72*a* being used by the user may not yet have requested user module 72*su* to perform any data access functionalities such as a read operation of the actual binary contents of the files, for example. At this time, the user may only be browsing or navigating through files and directories before actually accessing any file binary contents. Consequently, no file binary contents are downloaded at this time during the process. This avoids unnecessary data transmissions and associated network bandwidth requirements.

Once a request is made by an application to perform an operation on the actual file data, however, a file data subscription and management process is run by the system. Referring now to FIG. 13, a process for file data subscription and management is further described. File data subscription shares the same basic principles as the file overhead subscription described above, in that remote data are locally cached and considered valid during an active subscription period. In the case of file data subscription however, the remote data is actual file binary data rather than the file overhead information, as noted above. Continuing the example described with regard to FIG. 12, once an active subscription has been opened and it is assured that the file overhead information is available and valid, the user may launch application 72*a* (e.g., a word processor program, spreadsheet, or other utility application, etc.) to open and read a particular file such as "myDocument.doc" on storage device 18*b*. Upon receiving a data access request from application 72*a*, user module 72*su* searches its local cache in storage device 18*a* to determine whether file data for "myDocument.doc" is available and valid at event 1300. If the file data is determined to be available and valid at event 1302 (i.e., file data is present in local cache and an active subscription is in progress), user module 72*su* is able to provide the data to application 72*a* directly from the locally stored data at event 1304. If the file data is not available or valid at event 1302, then user module 72*su* sends a network request to device module 74*sd* to start a file data subscription on "myDocument.doc", at event 1306. Along with the request, user module 72*su* may also indicate any version numbers of "myDocument.doc" that are available in its local cache.

At event 1308, upon receiving the request from user module 72*su*, device module 74*sd* searches its local cache in storage device 18*b* to determine whether a reference file for "myDocument.doc" has been previously created. If it is determined at event 1310 that a reference file for "myDocument.doc" has not been previously created, then device module 74*sd* makes a copy of "myDocument.doc" for a reference file in its cache at event 1312. Device module 74*sd* may also initialize a sequential version numbering system to officially enumerate versions of file data. For example, "myDocument.doc" may initially be given an official version number one. Hence forward, if the actual file of "myDocument.doc" is changed, device module 74*sd* can compare the differences between the changed file and the original reference file to calculate what is referred to as a "Delta" which may be used to generate the next version of the file (in this case, version two).

As already noted, file data is the actual binary contents of a file, which may contain, for example a digital picture, music, text, graphical data, or the like or combinations of these. Unlike file overhead information, file data can vary greatly in size. For example, an electronic document may contain a few pages of 2 kilobytes of data or a few thousand pages of 2000 kilobytes of data. The present system recognizes that changes that occur to file data are mostly correlated. For example, when the user edits a 2 megabytes document, there is a high probability that a significant part of the document remains unchanged from the original document prior to editing. Since the current invention utilizes local storage devices to perform caching operations, the allocated storage size for caching purposes can also directly affect overall system performance. Because of the limited capacity of storage devices, the current invention recognizes that optimizing caching operations to improve the efficiency of storage device utilization can increase the overall system performance. Accordingly, spatial and/or temporal compression of file data may be performed by the system to optimize cache operations and data transmission.

Spatial compression may be performed on binary data to reduce redundancy on the binary data itself. Spatial compression can be applied for transmitting as well as for caching of file data. Temporal compression may be performed to extract differences between multiple versions of file data (binary data) that may be created over time. For example, if the original reference file (version one) contains 1800 bytes at the time it is established in the cache, but then later is modified by a user so that at the time after editing, it contains 1880 bytes, temporal compression may be performed on both versions of the file to create a difference file or a "Delta" file that contains the differences in the binary contents between the original reference file and the edited file. A Delta file may also extract data redundancy even if many segments of the reference data have been shifted by different amounts. Hence by applying a Delta to a reference file, versions of the associated file can either be upgraded (e.g., updated to a newer version) or downgraded. For example, analyzing binary differences between the original reference file (version one) and the edited file (version two) may be performed to create a Delta file which may be referenced as Delta 12. Consequently, file version two can be reconstructed by applying Delta 12 to the original reference file (version one). The system uses a table to keep track of the history of the file and changes that have been made over that history. If the table is relatively large, then it is more likely to have a record of previous data in the table and find more differences between the current file and one or more previous versions. If the table for this particular file is relatively small, however, there will likely be little to match and therefore the resultant Delta is larger, since whatever cannot be compared to be unchanged, must be sent in the Delta file. A reversal process is also possible, by creating Inverse Delta 21 from analysis of Delta 12 and the original reference file (version one). In such a case, Inverse Delta 21 can be applied to downgrade the edited file (version two) to the original reference file (version one). Temporal compression allows significant compression of data when different versions have much of the same binary content, because a delta file only contains binary changes. As result, multiple versions of a file data can be differentially transported or cached in forms of deltas rather than whole contents. In addition, multiple deltas based on a common reference file version may also be merged to further optimize temporal compression among file versions. For example, Delta 12 and Delta 23 may be merged to form Delta 13.

If it is determined that a reference file already exists at event 1310, a determination is made at event 1314 as to whether user module 72*su* has any versions of the requested file in its local cache in storage device 18*a*. This determination can be made based upon the request sent to device module 74*sd* by user module 72*su*, since user module 72*su* sends any version numbers that it has of the requested file, describing all Delta and Inverse Delta files contained in it cache for the requested file along with the request. It is further noted that device module 74*sd* may also already have one or more Delta and/or Inverse Delta files that represent previous file versions available in its cache. In any case, device module 74*sd* analyzes any available file version numbers indicated by user module 72*su* in the file data subscription request. If there is at least one Delta or Inverse Delta based on the available cache information of the requested file (e.g., "myDocument.doc"), device module 74*sd* determines at event 1316 whether to send Delta files ("Deltas") and/or Inverse Delta files ("Inverse Deltas") and use the available file versions that user module 72*su* currently has in local cache, or to send a reference file instead to optimize data transmission. The reference file is also sent when it has to be newly created, as at event 1312. Alternatively, device module 74*sd* simply instructs user module 72*su* to use a particular file version that user module 72*su* already has in local cache when it is determined that that version is the same as the current reference file ("current official version"). This might be the case when the associated file data has not changed since the previous active subscription to the file data by user module 72*su*, for example.

If, at event 1314, it is determined that user module 72*su* does not have any file data regarding the requested file stored in cache memory in storage device 18*a*, the device module 74*sd* transmits the reference file to user module 72*su* at event 1318. Device module 74*sd* and user module 72*su* both record time stamp data as to when the transmission of reference file(s), Delta file(s), Inverse Delta file(s) or file instructions have been successfully completed, at event 1320, to mark the starting time of an active file data subscription. Device module 74*sd* also stores file data subscription information in its local cache that indicates that user module 72*su* has a file data subscription starting on the associated time stamp to "myDocument.doc" and the particular file version that is being subscribed to (e.g., file version number one in the case where the original reference file is sent). By recording file data subscription information that contains file version numbers that are transmitted to user modules, a device module can use this to later analyze the level of significance of previously stored file versions for optimizing utilization efficiency of local storage devices for caching operations.

As user module 72*su* receives the file data from device module 74*sd*, the file (i.e., file data that makes up the file) is stored in the local cache of storage device 18*a*. Just as described above with regard to file overhead subscription, once the file data has been locally cached, the file data may be used directly by user module 72*su* to serve data access requests pertaining to the file's binary contents during the active file data subscription period without making any network requests to device module 74*sd*. Also similarly, device module 74*sd* is responsible to send file data updates associated with the file(s) having been transmitted (e.g., "myDocument.doc") to user module 72*su* during the active file data subscription period (e.g., 30 minutes). In this example, the active file subscription period may have officially started when user module 72*su* has successfully received the entire content of the reference file.

It should be noted here, that although the descriptions provided with regard to the example above and below refer to user module 72*su* and device module 74*sd*, this is for exemplary description only, as the same functionality is provided by user module 74*su* and device module 72*sd*. That is, a user from computer 74 may use user module 74*su*, in the same manner as described above by a user of computer 72 employing user module 72*su*, to access and control subscriptions to remote devices such as remote module 72*sd* controlling remote storage device 18*a*. Also, it is noted that subscriptions may be processed in both directions, i.e., use of computer 72 to access remote files from computer 74 and use of computer 74 to access remote files from computer 72, concurrently. Furthermore, it is noted that the invention is by no means limited to access of remote files from a single remote storage device, as any user module that is connectable over a wide area network may remotely access data from multiple remote storage devices, as long as each remote storage device is connectable with the wide area network and each is associated with a device module, respectively. Similarly, any device module associated with a storage device may provide remote access to multiple user modules over the wide area network.

As noted above, user module 72*su* provides data access functionalities to the local applications. As a result, user module 72*su* is capable of controlling data access behavior such as controlling the flow of data to the requesting local applications. For example, when a local application 72*a* performs read requests for parts of file data, user module 72*su* can accept the requests and wait for the entire file data to be successfully received before completing the requests. This method provides additional data access reliability by preventing any local application from experiencing possible interruptions of file data transmissions over the network. However, by this method, local application 72*a* has to wait for all of the file data making up the requested file to arrive before being able to perform any read operation. Depending upon the application usage, user module 72*su* may alternatively serve and complete one or more read requests for file data as soon as the requested parts of the file data are received from device module 74*sd*. In this case, local application 72*a* can begin reading parts of the file data during transmission of the remainder of the file data.

During file data transmission, user module 72*su* may also request device module 74*sd* to prioritize transmission of file data parts, based on data access behavior patterns of local application 72*a*. For example, local applications may request to read file data sequentially from beginning to end or disorderedly through out the entirety of the file data. By minimizing the waiting period for read requests, user module 72*su* reduces the overall data access latency, compared to simply waiting for an entire file to be transmitted before beginning any serving operations to the local applications. For example, local application 72*a* may open, read and play a music file such as an mp3 file. By serving portions of the file data as they are transmitted, the user is able to hear the music being played by local application 72*a* as soon as the requested parts of the file data are received by user module 72*su*, while the remainder of the mp3 file continues to transmit. Consequently, depending on the available network bandwidth, the user may be able to continuously hear the entire music file without interruptions during transmission of the associated file data.

In instances where the user applies a local application to modify associated file data by performing writing requests, user module 72*su*, upon receiving a writing request, may check its local cache to see if an associated final copy of the reference file has been created. A final copy is initially an exact replica of a reference file before any modifications. Writing operations performed by user module 72*su* on behalf of a local application 72*a* can be applied to the final copy. The final copy is created for the purpose of computing temporal compression to create a Delta file between the final copy and the reference file. A final copy may only be created as soon as the first writing request is received to conserve local cache storage capacity. Before computing temporal compression, user module 72*su* may also wait for a sufficient amount of time to elapse, e.g., about five to about 15 seconds, after the last writing, deleting or renaming request performed to the associated file data to ensure that local application 72*a* has temporarily stopped modifying the file data. A local application may typically request writing operations in a series of multiple attempts.

Another method of modifying file data contents by a local application is to request user module 72*su* to create a temporary file, perform writing operations on the temporary file, delete the associated file data and rename the temporary file accordingly. User module 72*su* may be able to detect the creation of a temporary file by inspecting the creation parameters (e.g. "hidden" attributes) or the associated file name (e.g., ending with ".tmp", or the use of certain characters such as "~"). Thus, user module 72*su* is able to detect the temporary characteristics of a newly created file. Local applications may typically use a temporary file to store intermediate computation results or to ensure reliability of data transactions. In order to minimize network bandwidth requirements, user module 72*su* may keep data access operations of temporary files on its local cache only, without informing device module 74*sd*.

After creating a Delta file by performing temporal compression between the final copy and a reference file of a file data (e.g., final copy and reference file of "myDocument.doc"), user module 72*su* may then inform device module 74*sd* of the new file data update. Device module 74*sd* may accept the new file data update which in turn initiates transmission of the Delta file from user module 72*su* to device module 74*sd*. After receiving the Delta file, device module applies the Delta file to update the reference file of the associated file data in its local cache as well as the actual file on the remote storage device 18*b*. Device module 74*sd* may also enumerate the new file data update with an official version number, generally the next unused number in a sequence of numbers for assignment to file versions. Device module 74*sd* may also search in file data subscription information, in local cache, for other connected user modules that are actively subscribed to the associated file data, and transmit the Delta file update to the other actively subscribed user modules using a point-to-multi-point data transmission process.

Device module 74*sd* may also listen to file access events from its local operating system to detect any changes to binary contents of files that are actively subscribed to by one or more connected user modules. Device module 74*sd* may perform temporal compression based on changes to binary contents of a file discovered during listening, and transmit the a Delta file resultant from the temporal compression to all connected and actively subscribed user modules. After receiving the Delta file, each actively subscribed user module updates the file data stored in each's respective local cache with the new version by applying the received Delta file to the file reference, as well as to the final copy, if available.

After updating the file data with a new Delta, both device module 74*sd* and the actively subscribed user modules may also create and store an associated Inverse Delta file in the local cache associated with each respective module. An Inverse Delta file allows device module 74*sd* and the actively subscribed user modules to undo the updating process of the file data that was performed when applying the Delta file, hence returning the file to a previous version. By storing Inverse Delta files, device modules and user modules can efficiently keep previous versions of file data in terms of Inverse Deltas (differential updates) rather than storing the entire content for each version of the same file. This greatly reduces the utilization of local storage devices for cache operations, making the system markedly more efficient.

The ability to reverse to previous versions may also be used to provide file back up capabilities. Device module 74*sd* or user module 72*su* may provide the user with the ability to restore the file data to a previous version that is available in the local cache of the module performing the backup. Device module 74*sd* may efficiently instruct actively subscribed user modules to perform such changes without sending the actual Inverse Delta file or files required to perform the changes, as long as the necessary Inverse Delta file(s) are located on the local cache(s) of the user module(s) actively subscribed. The number of Inverse Delta files that are stored locally in cache may be varied depending on user-specified operating parameters or the available local storage capacity for caching purposes.

Of course, the present system can alternatively be used to back up files from one or more computers to a storage device associated with another computer located remotely across a wide area network from one of more of the computers being backed up, and/or to one or more networked attached storage devices, without the use of Delta and Inverse Delta files, although this process has the potential to be quite time consuming. Such backup processing can be carried out securely and even across two or more firewalls, even when the two or more firewalls use different criteria for restriction of communications traffic therethrough.

Another purpose for storing Inverse Delta files is to facilitate efficient conflict resolutions among varying file data versions. Since the processes described above allow a binary file to be simultaneously used by multiple user modules over a computer network, a conflicting situation may arise when multiple user modules submit different Delta updates to device module 74*sd* that are based on the same reference file version of a particular file data, for example. In this situation, an Inverse Delta file may be applied to the reference file if a Delta file being submitted by a user module is based on a previous version of the reference file, after which the device module applies the Delta file received from the user module, and then reapplies a Delta file that is the inverse of the Inverse Delta file originally applied, thereby merging and applying the Delta files to make a current, up to date reference file (official version). Alternatively, the Inverse Delta file and the Delta file received from the user module may be merged to form another Delta file that is applied to the reference file to achieve the same result.

Another situation that may give rise to file data version conflict is offline usage. The present invention may allow user modules to continue to serve data access requests directly from their respective local caches even after the user modules are no longer connected to the network, or when network communication is not available. For example, a user may take computer 72 on an airplane and continue to edit "myDocument.doc" even though she or he does not have any network connection available. During the time that computer 72 is offline or disconnected from the network, user module 72*su* may still be able to store changes that are made with respect to the file data associated with "myDocument.doc" and/or file overhead information in storage device 18*a*, hence providing normal storage device functionalities to the local applications. When the network communications are resumed, user module 72*a* detects the online condition and begins contacting device module 74*sd* to submit the changes that were made during the offline period. While user module 72*su* was offline however, device module 74*sd* or one or more other user modules may have updated the version of "myDocument.doc". As a result, a version conflict situation occurs because the Delta update submitted by user module 72*su* is not based on the current official file reference version in this situation. For this reason, device modules are configured to store only one version, of a file data to be the current official version. All other versions are generated based upon Deltas which define the revisions to the file.

Version conflicts may be resolved by choosing only one version to be the official version among the possible choices or by creating a new file data with a new name to save the new changes. The decisions on version conflict resolutions can be made automatically by pre-defined policies or by the user at the time of conflict. In the example where a version conflict is to be resolved by choosing only one version to be the official version among the possible choices, device module 74*sd* may implement such resolution efficiently among the connected and actively subscribed user modules through use of the previously computed Delta Inverse files. For example, device module 74*sd* may be able to send new Delta files to a user module and instruct that user module to return to a particular previous version number (by applying associated Inverse Delta files) before applying the new Delta files. As a result, the availability of Inverse Delta files allow device modules to effect conflict resolutions using differential Delta and/or Inverse Delta files among user modules with minimum data bandwidth requirement over a computer network.

As an alternative to the creation of file data subscriptions that are initiated by data access requests made by local applications to a user module, as described above, file data subscriptions may also be created based on user-specified instructions to always have file data subscriptions to certain files or/and directories. Consequently, referring to the example shown in FIG. 11 once again, device module 74*sd* may initially be required to transmit numerous file data contents that are requested by user module 72*su*, so that these contents are always available in the local cache associated with user module 72*su*. During the initial transmissions, local applications may also ask user module 72*su* to perform data access requests to a certain file data that is not yet stored in its cache. To improve data access performance for local applications, the system may provide transmission priorities that can be adjusted based on data access requests made by local applications. As such, file data that are requested by local applications are considered high priority and are requested to be transmitted first to user module 72*su* to be stored in the local cache. As a result, user module 72*su* may request device module 74*sd* to temporarily suspend transmission of file data with lower priorities and to allocate more network bandwidth for transmission of file data with higher priorities.

As previously described, the system utilizes local storage devices to perform strategic data caching operations. For security reasons, the stored file data and file overhead information can also be encrypted, in a manner as described above, for example, or according to other known encryption techniques, and hence readable only to an authorized user. By having cached file data, both device modules and user modules are able to perform differential file updates with minimum network bandwidth requirement. As also noted, cached file data also facilitates back-up capability in both device modules and user modules which are able to restore file data to previous versions. Because of the limited capacities of storage devices, however, it may be impossible to cache all data access activities that can accumulate over time. Accordingly, the system provides for levels of significance to be assigned to the stored file data. Hence both device modules and user modules may decide which file data to keep or to delete for optimizing utilization efficiency of the local storage devices for caching operations. A cached file data may contain multiple file versions where each version may have a different significance level. The significance levels may be set by a user or IT personnel and may be based on one or more of the following factors: the time period that has elapsed since a particular file version was last accessed (e.g., the longer the time period, the lower the relative significance level); consideration of a particular file version for backup purposes (e.g., a user may specified a predefined number of file versions to be kept for backup purposes); and version conflict probability. With regard to version conflict probability, device module 74*sd* is able to track file data version numbers that each subscribing user module has in its respective local cache, as noted above. With this capability device module 74*sd* can determine which subscribing user modules do not have the current official file data version number (for example, a user module might have been offline, thus unable to receive any file data updates), and note that there is a possibility of version conflict. In this case, certain available versions of the associated file data may be given higher significance levels, since it is probable that there will be a conflict situation with the user module(s) that do not have the current official file data version. Device module 74*sd*, by tracking, can determine which official file version each user module currently has, and from that, determine which Deltas/Inverse Deltas should be assigned higher priority. Hence if the version conflict occurs, it can be differentially resolved by using the higher priority Delta or Inverse delta files which will be preferentially stored.

During setup of the system, the user, or other IT personnel, such as an IT manager in an office setting, selects the files in each storage device 18*a*-18*n* that are to be available to be accessed/shared. Then, when a computer with an enabled device having settings allowing file access connects with the network, either through connection server 14, or as otherwise described above, the device module of that computer accepts requests from any connected, authorized user module of another computer that is connected to the network and wishes to access the files of the first-mentioned computer. Note that file access may be permitted as to an entire drive (e.g., "C drive") or more than one drive; to one or more folders; or may be assigned to files on an individual basis. A noted earlier, access (of various levels) may also be permitted for remote desktop control and/or to other devices, such as video cameras, video recorders, or any of the other devices noted above, for remote control or monitoring thereof. As such, granular control of files and/or devices and/or desktops that are allowed to be accessed is provided.

Figure 14A:
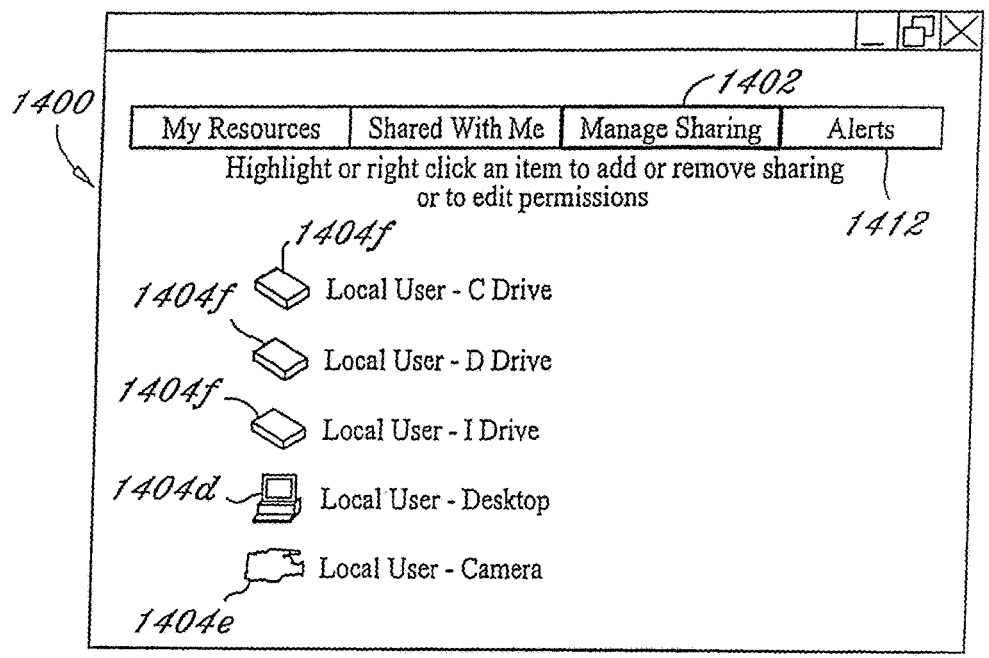
FIG. 14A illustrates one view in an example of a user interface that may be employed with the present systems and methods.

FIG. 14A illustrates an example of a user interface 1400 wherein the "Manage Sharing" function has been selected, such as by clicking on or otherwise selecting the tool button 1402. As shown, icons and textual descriptions of the user's files/folders/directories/drives that are available to be shared for access by other computers are displayed. Additionally, in this example, the user may optionally share desktop access or desktop control, by clicking on the Desktop entry 1404*d* and selecting the appropriate access settings. Additionally, in this example, the local computer controls a camera and access or control of the camera may be given to one or more external users by clicking on the camera/s icon or textual description 1404*e* and selecting the desired access settings. Once connection between the computer sharing the file, desktop or device with the computer being granted access is made, and alert is sent from the computer granting access to the computer being granted access (in this example the local user). The user of the computer being granted access has access to the same type of user interface 1400. By clicking on or selecting the "Alerts" function or button, the user can read the alert describing the fact the a particular remote user has granted access to a particular file, directory, desktop, device, or the like. The user is then presented with the option of accepting the grant of permission, such as by clicking on or selecting an "I accept" button, for example. The alert is then cleared and the permission is fully granted. Of course, many other acceptance/permission schemes may be carried out to confirm agreement of sharing between 2 or more users, as would be readily apparent to one of ordinary skill in the art.

Figure 14B:
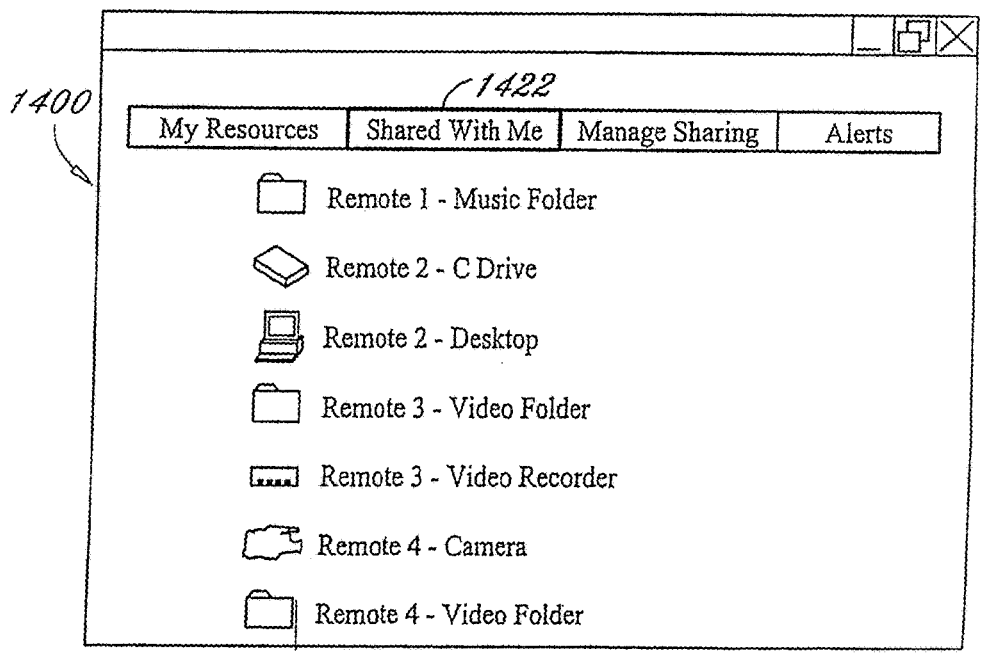
FIG. 14B shows another view of the example user interface of FIG. 14A.

Once permissions have been set up for particular files and/or desktop and/or devices, and for particular users, and fully granted as described, when a user module connects with the network, icons and/or text representative of files that are accessible from remote devices may be integrated into the file structure of the computer associated with that user module. Thus, the files, folder, directories, etc., that are accessible from remote devices appear automatically on the display of the computer associated with that user module. For example, FIG. 14B shows user interface 1400 wherein the "Shared With Me" function has been selected, such as by clicking on or otherwise selecting the tool button 1412. Note that access has been granted to a music folder of remote computer 1, while access to the C: drive and the desktop of remote computer 2 have been granted. As noted before, different levels of permission may be granted. Thus, depending on the settings granted by whoever set up remote computer 1, the local user in this example may be able to "read only", in this case, listen to music files only from the music folder, or may be granted additional privileges, such as the ability to save new music files to the folder and/or delete or edit existing files. Similar differences in permissions levels may have been granted regarding the C: drive from remote computer 2. Further, additional computers and desktops may also be accessed in the same manner.

Figure 15:
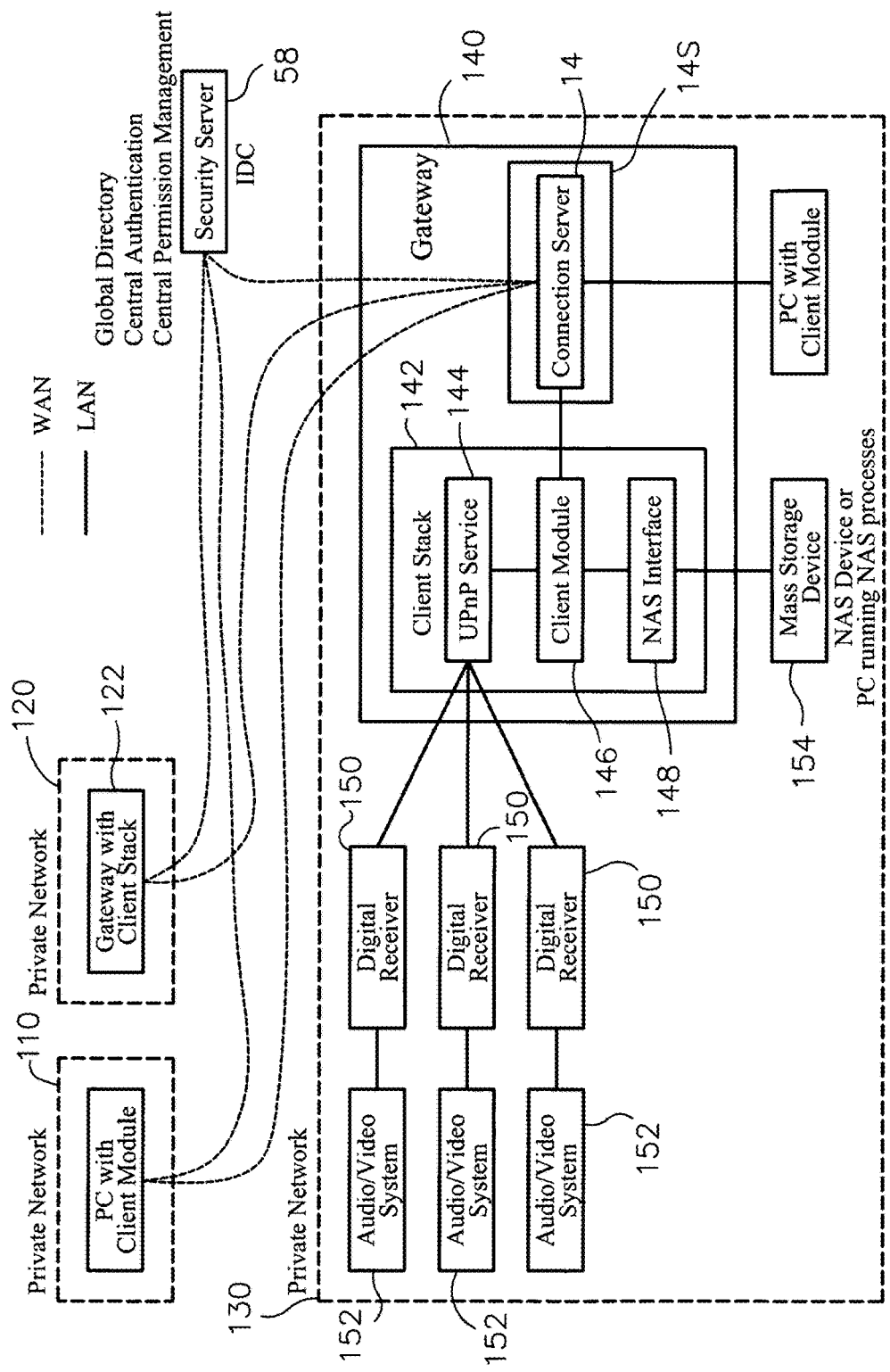
FIG. 15 shows implementation of a connection server on a gateway according to the present invention.

Means for file integration and manipulation may be run on each computer as a service, or alternatively, as an application or integrated with a web browser, for example. Further, means for integration, as well as other features of the present system may reside on a gateway server, wherein all computers connectable through a private network that access a public network through the gateway server, may run the features of the present system via the gateway server. Various other configurations of the system are also possible. FIG. 15 shows an example of three private networks that are connectable with each other over a wide area network (e.g., a public network, such as the Internet). Under this arrangement, connection server 14 is run on gateway 140 of private network 130. The system operates with the same functionality, so that computers/devices in the three private networks 110, 120, 130 have access to files/data from the others in manners already described. What is different about this arrangement is security server 58 need only be accessed for authentication purposes to begin a session, and may also be used for central permissions management as wells as optionally, a global directory. Advantageously, the provision of a centrally/publicly located security server reduces costs so that each distribute connection server does not have to pay an authentication service to be verified as a trusted server. Clearly, many such connection servers may be provided on a plurality of private networks to function as a distributed connection server for the system.

Once access has been granted, communications over the wide area network bypass security server 58 and go directly to connection server 14 for directing communications between the private networks. This may be particularly advantageous for users within the private network 130 in this example, since if communications are between two computers/devices that are both located in private network 130, then, after authentication by security sever 58, all further communications may be conducted on the private network, by going through connection server 14 locally. The bandwidth within private network may be much greater than that available for communicating over the public network. Therefore the communications may be carried out much faster within network 130 using this arrangement. Further, telecommunications costs are conserved since the communications do not have to go out over the public network.

Private network 110 show inclusion of at least one computer/pc provided with a client module that may be used to access information from any of networks 110, 120, 130 through connection server 14 according to the principles of the present invention. Network 120 includes a gateway 122 having a client stack that can be locally accessed by any other computers/devices within the network 120. As such, the client stack functions as a device for serving files/data to the users of network 120 that are connectable via the present system. The client stack can access information from the other networks in the same way that the client module of the computer in network 100 functions.

The client stack may include a client module, and optionally, other services for interconnecting other devices to the system through connection sever 14. For example, the client stack 142 in network 130 includes a client module 144 as well as UPnP service 146 and Network Attached Storage (NAS) service. UPnP service 146 functionally connects plug and play devices to the system through server 14 so that any users of networks 110, 120 and 130, in this example, can access such devices, given the appropriate grants and permissions, of course. For example, a user of a computer in private network 110 may access one or more audio/video systems 152 via digital receiver(s0 150 and gateway 140 to remotely set up one or more recording sessions, to download a music or video file, or to simply play a music or video file from its current location, among other available functions.

NAS interface 148 operably connects one or more storage device(s) 154 to connection server 14, thereby creating central storage for users of the system. Such central storage may be extremely useful for backups or other storage. For example, a user may bypass all of the computers running on the network and just save directly to the network addressed storage associated with the gateway 140. This arrangement also makes it possible to reduce the cost and complexity of gateway servers, as a storage device does not have to be built into the gateway server, since storage of nearly any amount can be flexibly added using NAS interface 148. Other arrangements are also possible as the present system is flexible and scalable. For example, connection server 14 may be located behind gateway 140, within network 130 as just one other variation, though still other configurations are possible.

As to the desktop access, the local user in this example may have been granted only viewing privileges to the desktop of remote computer 2, or alternatively, the local user may have been granted desktop control privileges, which inherently also includes viewing privileges. In either case, when the local user selects or clicks on the icon or description for "Remote 2—Desktop" (assuming remote computer 2 is online), then a full visualization of the current display of the desktop is displayed in a window on the local user's desktop (which refers to any visual display for any of the types of computers discussed previously, including cell phones, MP3 players, etc.). If remote desktop control privileges are granted, not only is the desktop of remote computer 2 displayed on the local user's local computer, but the local user may also operate the remote computer by manipulating the desktop in the same manner as if the user were operating the remote computer 2 locally. Thus, the remote control desktop functionality is very intuitive and requires no further training.

Specifically, the local user, from the local computer, may operate the mouse pointer/cursor of remote computer 2 in this example, by simply operating the local mouse, or other instrument that serves to operate a pointer/cursor on the local computer. Similarly, the local user can operate the keyboard of the remote computer 2 by operating the keyboard of the local computer using a keyboard or alternative device that the local computer may use to enter keystrokes. Accordingly, the local user may open a file on the remote computer and run an application on the remote computer, as well as edit the file and save it back to a storage device of the remote computer all from the local location. The control of the remote computer by the remote desktop control is essentially the same as a user has over his or her local computer. Further, since the desktop of the remote computer has been integrated on the local computer, the desktop is fully functional. For example, the local user may drag and drop a file from the local computer onto the desktop of the remote computer that is displayed locally, and that file is then transferred to the remote computer. Similarly, the local user may transfer data from the remote computer by dragging it off of the locally displayed remote desktop and onto the display or desktop of the local computer.

In the example of FIG. 14B, the local user has also been granted access to a video folder and a video recorder associated with remote computer 3. Once again the permission levels for access to such may vary. The variance in levels of permission that may be given for the video folder are the same as or similar to those described above with respect to other folders discussed. The video recorder permission may allow the user to view only, or the local user may be able to set recording information for recording programs, as well as view the programs, for example. Thus different levels of granularity with regard to permission may be set with regard to video devices and other multi-functional devices.

In the example, access and control of a video camera associated with remote computer 4 has also been granted. When the local user clicks on or selects the icon/text for the camera, the local user can view through the camera locate in the remote location 4 and, depending upon the functionality of the camera, may be able to control panning, zooming, etc. from the local location. Further, since the local user has been granted access to a video folder associated with remote computer 4 in this instance, if writing privileges have been granted, then the local user may choose to record video from the camera to a video file stored at the remote location, and/or to store the video to a local file that is the stored on a local storage device associated with the local computer.

Figure 14C:
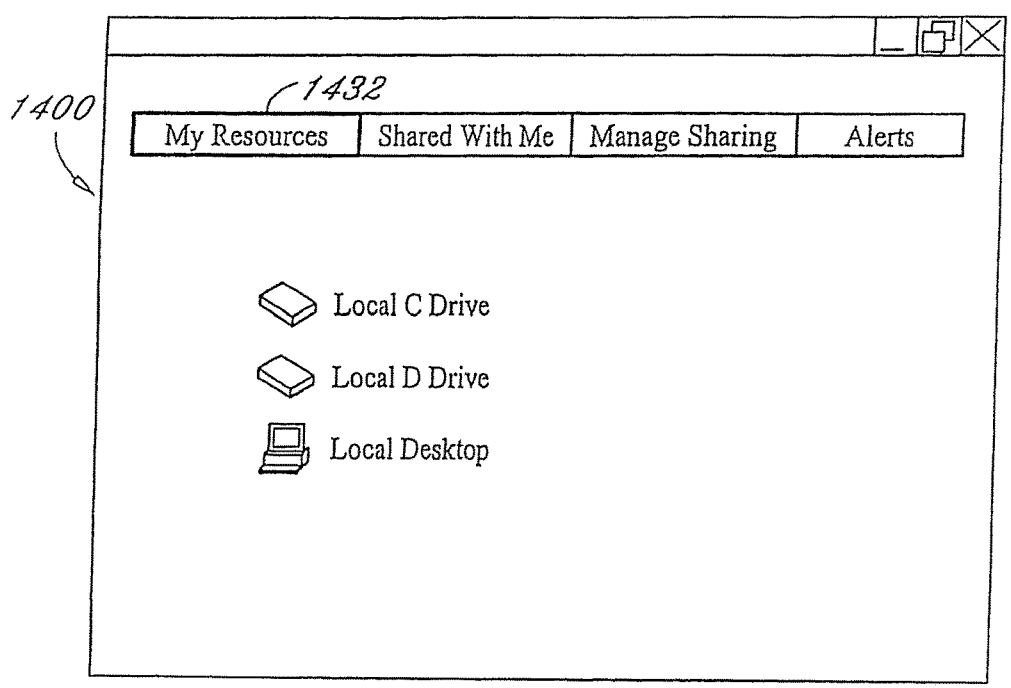
FIG. 14C shows still another view of the example user interface of FIG. 14A.

FIG. 14C shows a display of the local user's accessible files, drives, folders, etc., that are displayed by clicking on or selecting the "My Resources" button or function 1432. In this example, the C: Drive, D: Drive and Local Desktop are available to the local user. Further, by clicking on Manage Sharing 1402, the local user may share any of these resources with other computers, and set permission levels that the local user deems appropriate in the manners described above. Accordingly, the system facilitates rapid and easy establishment of one or more personal networks by a user over a wide area network such as the Internet or other wide area network, and provides secure connectivity between the computers on each network. A user can set up such a personal network to gain access to his or her own files from any of the computer/device types listed earlier, which can be as numerous and at as many different locations as needed. Further, using the integrated file structure of the files shared by other remote computers, the user may choose to run a file from the remote computer that the file is being shared by, but with a local application on the user's local computer. In this instance, the file is run locally, but stored remotely. Alternatively, the user could also store the file locally, as has been described above. Still further, using the remote desktop control features, the user could run a file application remotely by controlling the remote computer with remote desktop control.

The user can also directly operate remote devices over one or more such networks through the operation of a local computer connected with such device or devices over the network. For example, a digital video camera located remotely may be operated by a local user accessing the remote camera from a local computer that has integrated the controls for the remote camera into the local file structure, as described above. This functionality applies to all devices described herein, as the digital camera has been described as only one example of this functionality of the system.

The system provides a user a great deal of versatility. For example, a user may be away from home and office and need to send a file to a colleague that is remote from where the user is. The user can then attach the file needing to be sent, which is remote from the user (i.e., a remote file) to the user's email message and send it off to the colleague. Alternatively, if the colleague and user are already set up on a private network according to the present system, and the user has his or her own private personal network, the user can access the file from his or her own private network without the need for an email message as the file will be directly available to the colleague as a remote file to which permissions of access have been granted.

As another example, a user who is away from home and office may need to have a hard copy of a file located on a storage device associated with the user's office computer. The user may connect to the office computer to his or her cellular phone using the present system, and download the file that is needed to his or her cell phone. If the user's cell phone also contains RF sending capabilities (e.g., Bluetooth® equipped) then the user may further print the file for the desired hard copy, by sending RF signals to a printer equipped to receive RF commands, which may be located at an office the user is visiting, or at a photocopy business that is available to the public, or the like.

Using the remote desktop control features a user may directly operate one or more remotely located computers, by integrating the desktop of each such computer onto the display of the user's local computer. A remote desktop displayed locally can be operated with the same functionality that the user operates his or her own local desktop. A local user may practice point to multipoint connectivity and remote control over a number of computers by integrating the desktop of each of those computers onto the display of the local computer.

Using the present system, a local user may perform searches across the one or more personal networks that he or she has established. For example, using the integrated file structure capability, a user may perform a search on the storage devices of the local computer, a remotely located MP3 player, a remotely located desktop computer, and a remotely located cell phone for a particular mp3 file that the user is interested in playing. Upon locating the file, the user would then be able to play the file locally, while still storing the file in the storage device at whatever location the search found it. Alternatively, the user may also wish to store the file locally before, during or after playing.

As noted above, when data is updated, such as when a file is edited, for example, the system may be configured to automatically update all or some designated subset of computers on the network as soon as the update has been performed at one location. Computers that are offline at such a time will be automatically updated as soon as those computers go online again. The persistence of the system ensures that updates are completed for all online computers, as if there is some failure or problem during the update, the connection restores itself to ensure that the update is completed. Alternatively, the system may be configured so that computers/storage devices that are remote from a file that is updated are not automatically updated. In this configuration, the remote storage devices do not receive the updated until its associated computer contacts the computer associated with the storage device having the updated file and requests the file update.

User interface 1400 facilitates a fast and easy setup of a personal network across a wide area network, since users need simply click on the functionalities desired and needed for establishing the network as described above. The installation is intuitive and inexpensive as well. Advantageously, a user can be anywhere in the world that is accessible to the Internet and the user's networks will follow the user there and be accessible to the user over any network-enabled device, as noted. A user may set up multiple networks with the described features, and the networks may be intertwined if desired. Another advantage is that a user can change access and permission settings, or even remove shared files, or one or more computers altogether from a network almost instantaneously by simple click operations through the user interface 1400.

In addition to setting up one or more personal private networks for the user to gain access to his or her own data on remotely located computers, devices and storage devices, the system may also be used to share data with other users as well as allowing other users to share data with the user. As with personal private networks, a user may also be joined in multiple shared private networks, which may or may not be intertwined. Each user has full control over the access and permission levels that are granted to the other users regarding that users' files, devices or desktops that are to be shared, respectively. The data that is shared may be encrypted during transfer, as described above, and authentication may be required for each user/member of the shared network. The network is compatible with multiple firewalls, but is also secure for use with devices that do not use a firewall, including wireless devices, for example.

A shared network may be used for web conferencing also. For example, using remote desktop control, where each remote user has viewing privileges of the desktop only, a local user can produce a point to multipoint power point presentation. Alternatively a digital camera, or digital video player may be displayed on the local desktop and viewed by remote users via remote desktop control viewing. A further alternative is to share a folder with other users on the network, so that folder is integrated into the file structure of the remote users. In combination with telephone or voice over internet protocol (VOIP), a teleconference may be conducted while simultaneously working cooperatively on a shared file or files in the shared folder. Additionally, any user can drag or save files to the shared folder than can be accessed by the rest of the conferees for discussion thereof during the conference.

If the local computer is running Microsoft Windows®, then once the user module of the local computer connects with the network for the first time after access has been granted and thereafter until access is withdrawn, then the user can go to "My Computer" and see that the file integration feature displays an icon and/or other indicator or text for each of the folders, files, drives, directories, etc. that permission has been granted for. Thus, in this example, in addition to icons for the local user's directories, etc., icons for Remote 1—Music Folder, Remote 2—C Drive, Remote 3—Video Folder, and Remote 4—Video Folder are displayed, since these have been integrated into the user's file structure, and they appear along with the C drive, A drive, and any other accessible drives, directories or files that are displayed under the user's file structure (e.g., "My Computer"). Similar file structure integration functionality exists with other operating systems, although the display location may not be labeled "My Computer". Connection with a system for remote access may be carried out automatically upon connection with the network, or automatically upon selection of one of the icons representing a remote file. Operations on a remote file can be performed equally to those that may be performed on a local file. For example, searching, editing, etc. can be performed. Still further the present invention provides the ability to manually connect with the system as noted above, as a user option. In this way, a user may have immediate access to his/her files on any and all of his/her computers from any location globally that has Internet or other wide area network access.

By selecting or "clicking on" a file icon, the user gains access to that file or files represented by the icon. If the icon is a directory, when it is clicked on, the entire file structure of that directory is displayed, from which the user can select one or more files to work on. To work on a selected file, the user may choose to transfer the entire file over from the remote device to the local device, and this transfer can be done automatically upon receiving the file data access requests made by local applications, or by simply selecting a transfer command from a drop down menu, selection box, or other visual indicator on the display associated with the user module. Thus, the file may be accessed and worked on in exactly the same manner that the user would work if accessing the file directly from the computer that stores that file locally. No other directions or complicated procedures are required of the user to take a file from a remote device, and then transfer it to the local device, and then open it up, in contrast to software that has been available heretofore for such purposes. The present system automatically fetches the file and transfers the file into cache memory on the local computer, in a manner as described above. By storing the file in cache memory, this allows the user to access and use the file more than once, without having to re-transmit the entire file from the remote device each time the user wants access to the file.

As the user works on the file, such as by adding to the file, modifying or editing, each time that the user saves his/her work, the system compares the differences between the saved version of the file and the previous version of the file, and, as long as the user module remains connected to the network, the changes/differences are transmitted over the network to the remote device module, which are saved there, thereby maintaining the home file (i.e., official reference file, source file, master file or DataClient file) up to date with the latest revisions, as described above. This functionality saves the user a great deal of time, since there is no need to synchronize files when the user returns to the site of the device module. Further, there is no concern over having two different versions of a file, or concern that a user is not using the latest, most up to date version of a file. Optionally, all computers that are connected to the network, that share a file that the user is working on and that have a copy of that file in cache memory (or on a remote device) may be automatically updated concurrently with the updates of the device module file, each time an update is performed, when such computers are actively subscribed, as noted above. Computers that are not actively subscribed or are offline can be automatically updated when reconnecting with the network or initiating an active subscription.

With this functionality, when the user works on a file, it is automatically updated in the remote device by the device module. Once the file has been put into the cache memory on the local computer, the user can work locally on the file via the user module, as described above. Therefore if the connection to the network is lost, this will not affect the user's ability to work on the file. Updates to the official reference file (and optionally the file as located in other remote computers) obviously cannot be performed as long as the connection is broken. Furthermore, the system is persistent and may be configured on a user computer to automatically and repeatedly attempt to reconnect with any and all remote devices which are actively subscribed to when a connection is broken during an active subscription. The present software recognizes that the file is in cache and the user can continue working locally when the connection is broken. When the network connection is restored, the software automatically updates the home file (official reference file) on the remote device via the local user module's transmission to the remote device module, as described above (and optionally, on any other computers where the file may reside). This feature is useful not only for when a network connection is accidentally broken, but in situations where the user moves to a location where the user knows a network connection is not possible, as in the example described above, while flying on an airplane, or in some other location that is not network accessible. Even in these situations, as soon as the user logs into the network again, the official reference file may be automatically updated, so that when the user returns to the location of the home file (official reference file), the home file is already up to date.

Thus the present invention functions as if the user is storing the file on the user's local device (e.g., local hard drive), but it is actually functioning as a distributed drive, since the local file is only being stored in cache, and the file storage is occurring in the remote device by the device module. The present system is seamless and transparent, appearing to the user if he or she is actually working on a local file. There is no need to transmit video data of an image of a remote desktop, in contrast to what some prior art systems use. This greatly reduces bandwidth requirements and enables the present system to be used even if the user has access to only a dial-up modem connection. Further, since the entire file is not transferred, except on the original transmission of a file, i.e., updates transmit only the differences between the previous file and the edited file, this further reduces bandwidth requirements, and reduces latency of response. It should be noted also, that an original, complete file transfer is not always necessary over the wide are network either, since such a file transfer can often be performed locally, such as over a local area network having high speed, high bandwidth capability, before a user disembarks to another location.

If the user wants to have a local copy of a file that has been accessed from a remote storage device, the user may store a local copy in the local storage device. Such local storage does not prevent the automatic updates of the file in the remote storage device each time the user locally saves the file being worked on in cache. Thus, the user is ensured of having a completely up to date master copy of each shared data file at the home location/home locations (since home locations of shared files may vary). For example, the system may be set up such that when a user is away, working on his/her laptop, a personal file is automatically updated at the user's home computer storage device, while a business file is automatically updated at the user's work computer storage device.

As noted above, both user modules and device modules support compression of transmitted data, to still further reduce bandwidth requirements. The compression used does not depend upon multiple versions of the data, since only an original file or differences are ever transmitted in a single transmission, and this compression can also be used in conjunction with difference (temporal) compression. The present system supports difference (temporal) compression by calculating the differences between files (e.g., the difference between the file as originally downloaded and the file as edited, or the difference between the currently edited file and the most recent previously edited filed). The result of the differences that are determined is referred to as the "Delta". By transmitting only the "Delta" when updating a file, a much smaller file can be transmitted. By spatially compressing the "Delta" an even further reduction in bandwidth requirement is achieved. Further, Deltas can be compressed based on similar data even if many segments of the data from the file have been shifted by different amounts. Inverse Deltas may also be calculated to allow reverting to a previous version of a file, should a transmission be lost, corrupted or the like. Multiple Deltas may be merged to determine a net Delta, further conserving storage space and/or bandwidth requirements.

Not only are Deltas used to update a file at a remote location via a device module as a user makes edits to the file locally, but Deltas are also all that is transmitted from a device module to a user module when the user module already has a previous version of the file in its cache. The device module may keep information of multiple versions (or multiple Deltas) of each file that is accessible by user modules, and keep track of which user modules depend on each version of each file. This is necessary to calculate the appropriate Delta to be sent to a particular user module when access is made to update a file in a user module cache. The different versions of a file may be stored by the device module in local cache as different Deltas, rather than storing an entire file for each version. Only one version of each file is considered to be the current active file version. This is typically the latest update made to the file, which may be made by any of a number of user modules, or may be made at the site of the device module. Any particular version, other than the current active file version, may be stored by the device module when some user module has cached that version of the file data. By maintaining older versions of a file, such as by storing multiple Deltas, this enables the device module to be able to accurately update various versions of the file as they are received from various user clients. Each file has an associated file ID as well as a version number for tracking purposes. Hence Delta data may be particular to each user module, storing the changes made with regard to that particular user module.

The system may support subscriptions which help optimize performance of the system. Each device client information identifies all files (including folders and directories) local to the device client which are allowed to be subscribed to. Additionally, each device client keeps records of all particular user modules that are allowed access to each of the files that has been set to be subscribed to. Thus, subscription control is highly granularized. For example, a first user module may be allowed to access the entire C: drive of a device module, while a second user module may only be able to access a "Projects" folder within the C: drive of the same device module, a third user module may be allowed access to only a particular project file within the Projects folder, and a fourth user module may only be allowed access to a financial folder within the C: drive of the same device module. Subscription assignments are completely flexible from user module to user module.

Adding and removing of subscriptions can be performed either at the device module computer, or at the computer of the particular user module that the subscription pertains to. It is further noted that any of the subscriptions data may be managed and set at the connection server 14 and associated database 52, as one option, when a connection server is employed in the system. However, the preferred implementation currently is to manage subscription data at the user modules and device modules. Updates of subscription information are detected by the device module whether performed at the location of the device module, user module or connection server. When updates are detected by a device module, the device module sends the update information over the network, optionally through a connection server and to all user modules that subscribe to each file that has been updated with regard to subscriptions. As long as a subscription is active for a user module, that user module can trust that the cached data at the location of the user module is current, given the automatic updating facilities described above. Therefore, the user of the user module/computer does not have to be concerned with synchronization, or checking file properties to determine which version of a file is the latest. Also, since updates of files are sent on the basis of Delta information (which may further be compressed, as noted above) this provides superior performance, particularly when the user module is connected via a low bandwidth connection or is experiencing significantly high latency of response when communicating over the network. Decision as to which files to be subscribed to can be made by the user of the system and/or by a performance optimization algorithm which can be computed on any of the computer systems to be used by the user when using the present system.

The present system is persistent and therefore supports user modules that may not always be able to communicate (i.e., over the network) with the device module. Each user module both file data and management information such as usernames, authentications, device information, permissions, other subscription information, and other information that may be used in managing communication with remote devices, in cache memory. Changes in any of this information that are made by the user at that user module location while that user module is unable to connect with the network are stored locally in cache. Changes that can be stored include all normal drive operations, thus the interface can support normal functionality. Once the user module is able to re-establish a connection to the network, updates (including any updates to file data as well as updates to management information) may be automatically transmitted from that particular user module to the appropriate device module(s). In turn, the updated device module(s) then update any other user modules that are affected by the changes. Hence when the user works locally on a file, the user does not need to be concerned with managing the transmission or other movement of files back and forth between the user module (local computer) and the device module (remote storage device), as the system manages this automatically for the user.

The system may support access and control of multiple types of devices that may include but are not limited to data access to remote storage devices as described above; viewing of video from remote cameras and control of camera behavior; access to and control of home video and/or audio equipment, including digital video recorders, VCR's stereos, televisions and the like, home appliances, electronic equipment in vehicles, printers, fax machines and other office equipment, personal electronic equipment, including MP3 players and other portable devices, and desktop interaction with remote computers, which includes but is not limited to desktop viewing, keyboard control, mouse control, clipboard transmission, sending of special key-strokes (e.g. Ctrl-Alt-Del).

Thus, the present system supports remote viewing of video from cameras and also enables the control of camera behavior, including, but not limited to panning, title and editing, zooming, resolution control, aperture control, focusing, frame rate control and image quality control, as well as standard play, record, stop, start, on, off, fast forward, rewind, pause, slow and fast motion operations, etc. Using the present system for camera control, a user may trigger a remote camera to begin taping/recording, or set security cameras to turn on and/or begin recording when triggered by a motion detector, for example. Images taken by one or more remote cameras may be viewed in real time on the user's local web browser and/or stored to the user's local hard drive. Of course, the user may also control such images to be stored to a remote hard drive, e.g. a camera controlled by a local computer may be set to store images on remote storage device associated with another computer in a remote location.

A user interface 1400 may also be implemented to allow managing of multiple devices, including, but not limited any of the devices described herein. By implementation of the user interface 1400, a user may see a tree diagram, which shows different computers, and the devices that are connected to each computer and accessible to the user, as noted above. Icons for different types of devices allow types of devices to be easily observed, and icons may also be used to communicate device status visually and/or audibly.

A user interface provided by the present system facilitates the management of multiple remote devices. The user interface may display a tree diagram which shows different computers that are accessible using the present system, i.e., which contain at least one file to which the local computer has access to, as well as each remote device which is connected to each of the computers shown which is accessible (e.g., which the user of the user interface has permissions to), as well as desktops that a user may have viewing access to or remote control privileges thereto. Icons which visually and/or audibly distinguish different types of remote devices may be provided, so that the user can readily and easily visually distinguish between these types when viewing the user interface. For example, unique icons may be provided for remote storage device, remote camera, and desktop sharing, respectively. Optionally, the icons may also visually indicate and communicate device status.

The user interface also facilitates permission management, as also noted. Each type of device can include multiple permissions levels. Grants are assignable to a device by a user with administrative privileges to that device. A grant is created to allow a user module to have associated permissions on one or more device module. A user module having a grant of permission to a device module may then perform a subscription to data stored remotely and associated with/controlled by that device module. A subscription is a real time transaction between the user module and device module, as described above. Users may view the permissions that they have been granted via the user interface. Permission and grants may be stored in database 52, as part of the device management information stored, when a connection server 14 is included as part of the system. When a connection server 14 is not included, permission and grant data may be stored locally in the storage devices of each computer used in the system. However, authentication may still be performed at a third party, public address, such as a security server addressable over a wide area network. This avoids the necessity of having to verify each computer as a trusted server on the wide area network, since only the publicly addressable server will need to be verified in this case, and the publicly addressable server then authenticates each computer participating in a secure network for each session, respectively. In either case the user interface has access to the stored data regarding permissions and grants. Changes in permissions and grants may be distributed globally throughout the system by the server 14, or in cases where connection server 14 is not employed, by updates through a user module to affected device modules, and subsequent global updating to all other user modules via the updated device modules, similar to the update procedures for file data described above. Alternatively, changes to permissions and grants data may be updated at a device module and changes can be sent directly to all affected user modules. As noted above, each device (local or remote) may have multiple subscriptions which allow various levels of access to various user modules. Each user module may have one or more permissions with regard to one or more device modules.

The software of the system may be deployed as a service on Microsoft Windows® or other common operating system, and may be set to automatically start upon start up of the operating system. Software for system may alternatively be run as an applet rather than a service, so as not to require full installation on a particular computer. Optionally, this service or applet may also automatically connect to connection server 14, or directly to one or more other computers or may connect through a web browser, so that a user has instant access to remote devices when needed. Thus, the present software can run in the background. Optionally, a tray icon may be provided on the desktop of the operating system, which the user can click on for easy access to the present system, whether it is running in the background or not. Further alternatively, the present system may be run as an applet rather than a service and in this case, does not require full installation on a user computer.

The software of the system may allow integration or be integrated with a voice over internet protocol (VOIP) service for operation therewith during teleconferencing. The software may be integrated with a web browser, such as Microsoft's Internet Explorer® or Netscape Navigator®, or the like. Further, integration with chat software may be performed to facilitate file sharing during a chat session and/or remote operation of devices or the like. The software may be integrated with a whiteboard for direct input through the whiteboard into a network for conferencing purposes, thereby removing the need to train a video camera on the whiteboard. Likewise, video recording may be performed while conferencing. For example, a video stream may be recorded on one of the participant's computers or on a remote computer that is connected to the video camera or the network so that a video stream can record the session or portions thereof, such as a PowerPoint® or other presentation. It should be noted that recoding of both or either of the video streams coming from the video camera and the remote desktop may be recorded. Still further, an API may be provided for connectivity to other external devices or applications.

The present invention provides many advantages over currently existing system for remote data access. For example, local access to pictures, such as jpeg images, mpeg clips and the like may be provided by the system. Thus, for example, a user could subscribe or grant permission to his parents to access a portion of his home computer drive containing pictures of the parents' grandchildren. Upon logging into the present system at their own home or some other location remote from the computer drive containing the pictures, the grandparents (i.e., user module with grant and permission) have one or more icons displayed on their user interface for access to one or more files containing the pictures of the grandchildren located on the remote computer or in the local cache of the computer used by the grandparents. By clicking on one of these icons, the grandparents can view the pictures contained in the remote device. The pictures are initially sent to the user module in compressed form, for example. By this arrangement, the user is relieved of the extra time and expense that is currently required to upload pictures to a personal website hosted by a web-hosting company, and the grandparents can also access the pictures more easily, since they don't have to log onto such a personal website or go through any other special procedures to download the pictures. Rather, they simply click on an icon that is already appearing on their user interface, and the pictures automatically open up on their display. Optionally, the grandparents in this example may choose to store one or more pictures to their local device, such as a local hard drive or the like.

As noted above, the system may also provide remote access to music, whereby music files that are permitted to the user show up on the display of the user's computer and may be selected to be played from the remote storage device on which the selected music is located, or from local cache if the selected music has already been downloaded locally. Selective transmission of the file from a remote location allows the user to begin listening to the music before the entire file has been downloaded.

As another example, the system may provide local access to remote printers. For example, by connecting printers (such as by wireless connection or CATV wired connection, for example) to one ore more user computers, the system provides a peer-to-peer connection between each user computer and all printers that may be accessed by that user computer, without the need for an access point. By connecting according to the present methods, a user of a user computer may visualize an icon and/or text or other indicator on the user computer for each printer that is accessible, and may print to any of these printers, directly from the local user computer. Any device, computer, or data can be completely controlled in the network, even when the local computer and the device computer or data being controlled are behind different firewalls. The remote computers may be connected via a local network and/or wide area network. Among the many advantages provided by this arrangement, an extension of the file/picture sharing example discussed above would allow the user to print a photograph directly to the remote printer located at the grandparent's remote location, without the need to email the photo, or to require any active participation of the grandparents whatsoever.

Such capabilities may be provided to any of the remote devices discussed herein. As a further example, a digital video recorder may be connected to other remote digital video recorders for file sharing, even when various recorders are located behind different firewalls. Also, if one recorder has recorded only a portion of an event, another recorder may transmit a Delta file to complete the recording. A user computer connected to one or more digital video recorders or other video/audio devices may also direct recording and transmission of recordings among remote devices. Additionally, display devices may be connected to the above-described computer network and may be selected in a similar fashion as the printers described above. In this manner, a user may, for example, display pictures or video on a large display in the living room, while the data is located on another connected computer in the bedroom. Also, a user may operate a remotely located digital video recorder or other video player to play back a video locally on the user's local computer.

The present invention provides many advantages over currently existing systems for remote data access. For example, local access to pictures, such as jpeg images, mpeg clips and the like may be provided by the system. Thus, for example, a user could subscribe or grant permission to his parents to access a portion of his home computer drive containing pictures of the parents' grandchildren. Upon logging into the present system at their own home or some other location remote from the computer drive containing the pictures, the grandparents (i.e., user module with grant and permission) have one or more icons displayed on their user interface for access to one or more files containing the pictures of the grandchildren located on the remote computer and in the local cache of the computer used by the grandparents. By clicking on one of these icons, the grandparents can view the pictures contained in the remote device. The pictures are initially sent to the user module in compressed form, for example. By this arrangement, the user is relieved of the extra time and expense that is currently required to upload pictures to a personal website hosted by a web-hosting company, and the grandparents can also access the pictures more easily, since they don't have to log onto such a personal website or go through any other special procedures to download the pictures. Rather, they simply click on an icon that is already appearing on their user interface, and the pictures automatically open up on their display. Optionally, the grandparents in this example may choose to store one or more pictures to their local device, such as a local hard drive or the like.

The present system may also be optionally employed to perform synchronization of files among a user's multiple computers. Referring back to the operations described above, the system is designed to automatically update at least the "master copy" of a file at a remote location (i.e., the file at the location of the device module from where the file was accessed by the user module) as the user makes changes to the file locally on the computer associated with the user module. However, the user may be provided with alternative synchronization options by the present system. For example, the user may choose to always synchronize all copies of a file, wherein, whenever the user makes a change to that file locally, at any location, then all of the devices which subscribe to that file are automatically updated immediately. This option, and all others described below, may be set to apply to only one file or any number of files to which the user module is subscribed. At the device module end, such options may be chosen to apply in the same way. Another synchronization option provided by the present system is one in which a local copy of the file is stored on the local computer, and changes with at least one other remote device are automatically synched.

The present system may also be employed to use one computer at one location to run files that are on one or more remotely located computers or storage devices associated with remote computers. This can be very useful when an application is loaded on only one computer, but is needed for files in other locations, for example. As one example, a user may have virus checking software on the local computer, and access files remotely located on storage devices and associated with computers at three other remote locations. With the use of the present system, the user can virus check all files in all four locations using the local virus check application. Of course, this feature is not limited to virus checking, but applies to locally running any application with respect to remotely located data.

The features of the present invention can also be employed as a backup service, as already noted above. A device module may be designated as a central storage for backup services, so that a backup copy is always synched at a specified device location. All of the foregoing options may also be applied to data files such as email, address book files, business cards, and the like, so that a user can be ensured that contacts, telephone numbers and the like are always up to date on all the user's machines.

The synchronization and backup functions provided by the present system, like the remote access and updating functions, can be set to function according to different options. For example, synchronization or backup according to any of the above-described schemes can be set to run on startup of a local computer, power down of the local computer, or on demand (i.e., at the user's request or command). A synchronization or backup operation may be paused and resumed, since the present system is persistent. Synchronization and backup are based on the size of the last modified user preference, therefore these processes are differential updates done at the file level of granularity, which reduces bandwidth requirements, since a significant portion of the data need not be transmitted. Hence, these operations provide significant advantages over currently available products, since there is no need to copy the files from one location to another.

As noted above, synchronization and/or backup processes may be performed as point-to-multipoint operations, i.e., synchronization and/or backup may be performed with regard to all computers connected and subscribed simultaneously. Alternatively these processes may be set as to selective computers, which may be any subset of the full set of computers that are connected and subscribed. Thus, in the example provided above with allowing access of a user's pictures by his parents, the user may set the system so that when the user saves pictures to his local computer, in a file that has been granted permission to his parents, the system simultaneously also saves the pictures to the parents' hard drive (remote device) Further, there is granular control of these processes, as a set or subset for one file may be different from a set or subset specified for another file. Thus, continuing the example, although the user may also share a file containing recipes with his parents, the user may choose to merely allow his parents access to the recipe file, but not automatically save new recipes directly to the parents' hard drive each time the use saves a new recipe to his local storage device.

Another mode for performing backups allows a user to set the system so that a first time a backup is performed, it is stored on a first remote device. On the next performance of a backup, the data can be stored to a second remote device, which may be connected to the same remote computer or a different remote computer. A third backup could be performed on still a different remote device, with the fourth backup cycling back to the same remote device where the backup was performed during the first backup. Any number of remote devices can be employed in this type of backup mode, with any order and any number of remote computers, as desired to be set by the user.

Another benefit of the systems ability to provide granular settings, is that updates, synchronizations and backups can be set to ensure segregation of files. For example, the system can be set to ensure that files identified as business files will never be stored on a home computer and files designated as personal files (such as the pictures described above, for example) will never be stored on a work computer. This ensures that business files and personal files can be kept completely separate without the user having to take efforts to ensure that the file he is currently working on is correctly routed each time the user is finished using the file. This feature does not require the user to copy business files to a "briefcase" or other special folder as an aid to segregating business files from personal files, but is automatic, once the settings have been put in place.

Third party access to files can be centrally controlled with the present system, since management information such as permissions can be set at the DataClient. The present invention provides a viable alternative to the use of VPN's since it provides a "tunnel-through" capability that can be used even when two or more computers or networks are located behind firewalls having different settings, is also useable by computers that connect to the network via wireless, with no firewall and can still provide secure communications, and is therefore useable from anywhere in the world to send and receive secure, encrypted information. Further, the system does not require a complicated setup to a fixed location, in contrast to VPNs, which may require extensive hardware and/or software setups. With the present invention, there is no VPN information that needs to be set up. All that is required is to set up device module files to allow a specified user or users access to specified files on the DataClient computer. The owner or other authorized user of the DataClient/device module files can set up permissions by merely specifying which user name(s) to grant permission to or by assigning a login number and a password (referred to as the "adhoc method") to a user and then clicking on particular files or directories to indicate which files can be accessed by a particular user and which files cannot. The user (UserClient/user module) only need to log into the Access and Control System (connection server 14), download self-executing software to operate the system, and access the DataClient files using his or her user name or the login number and password (in the case of the adhoc method) provided by the owner of the DataClient files. Optionally, this method may be additionally or alternatively configured to require confirmation of biometric data such as fingerprint or retinal scan data from the user. Icons representing the files that can be accessed are then automatically displayed on the user interface of the UserClient, and the user simply double clicks on these to access the DataClient files that the user wishes to obtain access to.

With the ability to define granular settings, command filtering is supported. Thus, for example, the DataClient owner can set files that are to be accessed with specificity. For example, even within a particular folder, the owner can set certain particular files for access by one or more UserClients and decide not to allow access by any UserClients to certain other files within the same folder. Once certain files such as folders or one or more directories have been set for particular access, it becomes an easy matter to simply drag and drop an additional file into such folder or directory, wherein that file automatically takes on the settings assigned to the folder or directory that it was dragged to. Copying or cutting and pasting to such a folder or directory obtains the same results. Searching of the contents of such folder, directory or even individual files may also be performed. Command filtering allows central management of file access permissions, such as by IT managers, and the like.

During an active subscription, actions taken on a file by a user who has accessed a file from a remote storage device may be observed by the computer associated with that remote storage device. This functionality may be usefully applied as a remote observation system, such as for child protection functionality. For example, a parent or teacher may provide a child or student access to files on the parent or teacher's storage device(s). When the child is using such files (i.e., actively subscribed), the parent or teacher can monitor which files the child is accessing and what is being done with those files. Optionally, the teacher or parent can monitor the usage of the remote computer the child is working on in real time. Remote observation may be configured to be unobtrusive and not visible to the child, or it may be configured such that the child is aware that the remote real-time monitoring function is enabled. Thus, for example, a teacher may determine whether a student is doing homework or playing video games. Of course, additionally, the system may be used to prevent a child's access to selected files. Additionally, the system may be configured to send a log file of the user's activities to the computer associated with the remote storage device from which a file or files were accessed, so that the user of the computer having the files that were accessed is notified of the activity. The log file provides an audit trail that is searchable to provide monitoring details. The local file may be as detailed as to provide each keystroke that was executed. Alternatively, the system may alert a remote observer, such as a teacher or parent, for example, that certain activities are being initiated on the remote computer by having the remote computer send out an email or phone message to the parent or teacher, or other remote observer. The use of a warning signal is particularly useful for the remote parent or teacher, as this provides a time specific message as to when remote activity takes place.

As described above, the present system functions so that a user can work with remote devices/data as if the user were working locally on the computer to which such remote device is locally connected to. When saving data, the user save that data to the remote device from which the data file was originally accessed, as the system makes it appear that the user is locally saving the data. The system is extremely efficient and supports encrypted transmissions, multiple users, on demand and scheduled tasks, and functions even with computers located behind firewalls having different, potentially incompatible settings. In addition to hard drives and other remote data storage devices, the present system functions to control remote devices such as cameras, printers, fax machines, scanners, home video and/or audio equipment, home appliances such as refrigerators, furnaces, air conditioning units, toasters, water heaters and any other devices operatively connected to a microprocessor. Synchronizations/backups of files as well as applications containing data (e.g., Microsoft Outlook®, Project) may be performed. Antivirus software may be updated on a remote device from a local operation. The system further supports presentation sharing, application sharing and collaboration in parallel on a file.

Varying security levels and/or permissions may be set granularly, down to the single file level.

The present system facilitates device integration, as a host of different devices may be remotely controlled from a single, or multiple access points at any global locations that have network access. For example, home appliances which are locally controllable via one or more microprocessors may be remotely controlled as long as those microprocessors have network access. Similarly, cameras (including security cameras), home entertainment devices, and other "smart house" devices may be remotely controlled using the present system. For example, content stored by a VCR, DVR or the like can be shared using the present system. Also, the ability to set permissions with high granularity allows a user to prevent sharing of files containing copyrighted subject matter.

The present system is also applicable to factory automation. For example, many current machines store operating information and other data in a local storage area. To gain access to such data, it is typically necessary to download it to a portable storage device, if access is required at another location, or to format such data to be emailed or FTP's to another location. Using the present invention, such data can be accessed directly from another computer after the appropriate permission settings have been put into place, without the need for a file transfer or email.

Any devices or appliances which are connectable to a computer via USB, serial or parallel port connection, Firewire® (IEEE 1394), Bluetooth®, or other hard wired or wireless connection can also be remotely accessed and controlled according to the present system.

The present invention provides many features and functions which have not heretofore been available in remote desktop applications, as discussed above. Access to the file systems of remote storage devices is provided, along with full functionality for using the file systems just as you would if you were locally accessing the file system. More efficient transfer of files is facilitated in that Delta and/or Inverse Delta files are all that is required to be transmitted once a file has already been downloaded and then modified. Additionally remote desktop control may be performed simultaneously, with multiple remote computers and/or remote devices, as opposed to prior art systems that are limited to one-to-one connections. The control that is provided allows full functionality and control of a remote storage device, including searching capability. Uploading and downloading can be performed in a distributed manner, from multiple locations, so that centralized storing of all data, whether business, or personal is not required. File sharing, including photos, videos and music are facilitated. Backup of data may be carried out centrally from one computer, with regard to multiple remotely located devices which may be behind different firewalls. The backups may be performed simultaneously.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A system for data caching, the system comprising:
   a network communication device configured to receive first data from a first computer via a first computer network, the first data being sent by the first computer responsive to file data stored at the first computer being modified to generate modified file data; and
   a hardware processor configured to:
      execute the first data to replace a copy of the file data stored on a memory device with the modified file data,
      responsive to receipt of the first data from the first computer via the first computer network or execution of the first data to replace the copy of the file data stored on the memory device with the modified file data, identify that a second computer is actively subscribed, and
      responsive to identification that the second computer is actively subscribed, cause the network communication device to transmit second data to the second computer via a second computer network so that the second computer replaces a copy of the file data stored on another memory device with the modified file data,
   wherein the hardware processor is configured to identify that the second computer is actively subscribed from a comparison of a time stamp and a time threshold, the time stamp being associated with the modified file data, and
   wherein the hardware processor is configured to identify that the second computer is actively subscribed responsive to receipt of the first data by the network communication device from the first computer via the first computer network.

2. The system of claim 1, wherein the hardware processor is configured to identify that the second computer is actively subscribed from a comparison of a directory associated with the modified file data and a directory subscription.

3. The system of claim 1, wherein the first data is the same as the second data.

4. The system of claim 1, wherein the first data is different from the second data.

5. The system of claim 1, wherein the first data or the second data comprises a Delta file.

6. The system of claim 1, wherein the hardware processor is configured to identify that the second computer is actively subscribed responsive to execution of the first data to replace the copy of the file data stored on the memory device with the modified file data.

7. The system of claim 1, wherein the first computer network is the same as the second computer network.

8. The system of claim 1, wherein the first computer network is different from the second computer network.

9. A system for data caching, the system comprising:
   means for receiving first data from a first computer via a first computer network, the first data being sent by the first computer responsive to file data stored at the first computer being modified to generate modified file data;
   means for executing the first data to replace a copy of the file data stored on a first memory device with the modified file data;
   means for identifying, responsive to receiving the first data from the first computer via the first computer network or executing the first data to replace the copy of the file data stored on the first memory device with the modified file data, that a second computer is actively subscribed; and
   means for transmitting, responsive to identifying that the second computer is actively subscribed, second data to the second computer via a second computer network so that the second computer replaces a copy of the file data stored on a second memory device with the modified file data, the second memory device being different from the first memory device, wherein the means for identifying is configured to identify that the second computer is actively subscribed from a comparison of a time stamp to a time threshold, the time stamp being associated with the modified file data, and wherein the means for identifying is responsive to receiving the first data from the first computer via the first computer network.

10. The system of claim 9, wherein the means for identifying is configured to identify that the second computer is actively subscribed from a comparison of a directory associated with the modified file data and a directory subscription.

11. The system of claim 9, wherein the first data is the same as the second data.

12. The system of claim 9, wherein the first data is different from the second data.

13. The system of claim 9, wherein the first data or the second data comprises a Delta file.

14. The system of claim 9, wherein the means for identifying is responsive to executing the first data to replace the copy of the file data stored on the first memory device with the modified file data.

15. The system of claim 9, wherein the first computer network is the same as the second computer network.

16. The system of claim 9, wherein the first computer network is different from the second computer network.

* * * * *